(12) United States Patent
Komatsu et al.

(10) Patent No.: US 7,579,795 B2
(45) Date of Patent: Aug. 25, 2009

(54) BRUSHLESS-MOTOR DRIVING CONTROL DEVICE, IMAGE READING APPARATUS, AND IMAGE FORMING APPARATUS

(75) Inventors: Makoto Komatsu, Ninomiya-machi (JP); Hiroshi Koide, Yamoto (JP)

(73) Assignee: Ricoh Company Limited, Tokyo (JP)

( * ) Notice: Subject to any disclaimer, the term of this patent is extended or adjusted under 35 U.S.C. 154(b) by 106 days.

(21) Appl. No.: 11/705,834

(22) Filed: Feb. 14, 2007

(65) Prior Publication Data

US 2007/0247092 A1    Oct. 25, 2007

(30) Foreign Application Priority Data

Feb. 14, 2006 (JP) .............................. 2006-037089
Oct. 16, 2006 (JP) .............................. 2006-280909

(51) Int. Cl.
H02P 25/08 (2006.01)
(52) U.S. Cl. .................. 318/254.1; 318/800; 318/801
(58) Field of Classification Search ................ 318/254, 318/800, 801, 254.1
See application file for complete search history.

(56) References Cited

U.S. PATENT DOCUMENTS

| | | | | |
|---|---|---|---|---|
| 4,489,266 A | * | 12/1984 | Franzolini .................... | 318/800 |
| 5,504,404 A | * | 4/1996 | Tamaki et al. ................ | 318/432 |
| 5,585,708 A | * | 12/1996 | Richardson et al. ......... | 318/800 |
| 5,585,709 A | * | 12/1996 | Jansen et al. ................. | 318/807 |
| 5,920,162 A | * | 7/1999 | Hanson et al. .......... | 318/400.04 |
| 6,157,609 A | * | 12/2000 | Shoji et al. ................ | 369/275.3 |
| 6,349,081 B1 | * | 2/2002 | Shoji et al. ................ | 369/47.15 |
| 6,359,846 B1 | * | 3/2002 | Shoji et al. .................. | 369/47.5 |
| 6,807,133 B2 | * | 10/2004 | Ariyoshi et al. .......... | 369/44.42 |
| 7,068,572 B2 | * | 6/2006 | Ariyoshi et al. .......... | 369/44.42 |
| 7,180,263 B2 | * | 2/2007 | Maeda et al. ................ | 318/719 |

FOREIGN PATENT DOCUMENTS

| | | |
|---|---|---|
| JP | 2000-166287 | 6/2000 |
| JP | 2000-195146 | 7/2000 |
| JP | 2002-291282 | 10/2002 |
| JP | 2003-023791 | 1/2003 |
| JP | 2003-079184 | 3/2003 |
| JP | 2004-208491 | 7/2004 |
| JP | 2005-033957 | 2/2005 |
| JP | 2005-122089 | 5/2005 |
| JP | 2006-037089 | 2/2006 |
| JP | 2006-280909 | 10/2006 |

* cited by examiner

*Primary Examiner*—Bentsu Ro
*Assistant Examiner*—David S Luo
(74) *Attorney, Agent, or Firm*—Hraness, Dickey & Pierce, P.L.C.

(57) ABSTRACT

A drive control device for a brushless motor having a rotor and a plurality of coils with different phases can be included in an image reading apparatus or an image forming apparatus. The drive control device may include a detection target configured to rotate in synchronization with rotation of the rotor and having formed thereon a pattern representing modulation information, a detector configured to read the pattern and to output modulated output signals, a demodulator configured to demodulate the modulated output signals and to obtain demodulated information, and a controller configured to control rotation of the rotor on the basis of at least the demodulated information obtained by the demodulator.

19 Claims, 14 Drawing Sheets

BRUSHLESS-MOTOR DRIVING CONTROL DEVICE, IMAGE READING APPARATUS, AND IMAGE FORMING APPARATUS

PRIORITY STATEMENT

The present patent application claims priority to Japanese patent applications no. 2006-037089, filed in the Japan Patent Office on Feb. 14, 2006, and no. 2006-280909, filed in the Japan Patent Office on Oct. 16, 2006, the contents and disclosures of which are hereby incorporated by reference herein in their entirety.

BACKGROUND

1. Field

Example embodiments relate to brushless-motor driving control devices, image reading apparatuses, and image forming apparatuses.

2. Discussion of the Related Art

In conventional brushless DC motors, typically, rotation is controlled by detecting the position of a rotor using sensors, for example, Hall elements.

In the case of a three-phase brushless DC motor, one Hall element is needed for each phase, so that three Hall elements are needed in total.

In another conventional motor driving method, called the sensorless DC motor driving method, rotation of a brushless DC motor is controlled on the basis of induced voltages that occur on coils of the motor without using sensors, for example, Hall elements.

The sensorless DC brushless motor driving method is already used in large-scale machines in which a considerable amount of heat is generated so that it is not feasible to use sensors, for example, Hall elements.

In various types of electronic equipment in which a motor is used to generate a driving force, the sensorless DC brushless motor driving method may be used to reduce cost.

In the sensorless DC brushless motor driving method, the position of the rotor may be detected on the basis of inducted voltages that occur on the coils of the motor.

For example, at the time of activation of the motor, induced voltages do not substantially occur on the coils of the motor, so that excitation currents are sequentially supplied to the coils at predetermined or desired timings so that the motor is forced into an active state.

That is, during activation of the motor, open-loop control is exercised.

After the rotation rate of the motor increases so that sufficient induced voltages occur on the coils, switching timings for excitation of the coils are calculated on the basis of induced voltage signals, and the sensorless DC brushless motor may be driven according to the switching timings.

During an early period of activation, currents may be forced to flow through coils of individual phases using angular-position detecting signals of a rotary member that is driven by a driving force generated by the motor.

When the motor is activated, the rotor is pulled to three predetermined or desired positions to determine references for timings of switching currents for the individual phases on the basis of angular-position detection signals.

After the references are determined, the positions of magnetic poles of the rotor may be detected on the basis of angular-position detection signals so that the motor may be drive without using Hall elements or induced voltages.

According to the sensorless brushless DC motor driving method described above, in which the position of the rotor is detected using an induced voltage, an induced voltage is not obtained when the motor is stopped.

Thus, during a certain period after activation of the motor, until the induced voltage reaches a detectable level, excitation currents are sequentially supplied to the coils of the motor at predetermined or desired timings, thereby activating the sensorless brushless DC motor.

This method of controlling activation is effective for devices with stable load or devices in which problems do not occur even when the rotation rate becomes too high.

However, when the existing sensorless brushless DC motor driving method is used in a laser beam printer, a copying machine, or the like, the following problems may arise.

First, since the load of the motor is not constant at the time of activation depending on the status or amount of toner in the toner cartridge, a sufficient torque may not be generated depending on the position of the rotor at the time of activation, so that activation fails.

Second, since open-loop control is exercised at the time of activation, rotation of the motor at an excessively high rotation rate might cause degradation of the photosensitive drum.

In order to overcome these problems, according to Japanese Unexamined Patent Application Publication No. 2003-79184, a first detector detects a rotation position of a rotor of a motor, and a second detector detects a rotation position of the rotor on the basis of an inducted voltage that occurs on a coil when a current is not flowing through the coil.

When the motor is activated, driving control of the motor is started on the basis of the result of detection by the first detector. Then, at predetermined or desired timings, driving control of the motor is switched on the basis of the results of detection by the first detector and the second detector.

Until it becomes possible to detect the rotation position on the basis of an induced voltage, the first detector detects regularly spaced timing marks formed on a detection target that rotates together with the rotor to count the number of pulses output successively, excitation currents are forcibly supplied sequentially to the coils of the motor when the number of pulses counted reaches a predetermined or desired number.

During this period, open-loop control is exercised, e.g., the rotation rate is not controlled on the basis of detection of the angular velocity of the motor.

According to Japanese Patent No. 3690296, the rotor of the motor is pulled to three predetermined or desired angular positions, the angular positions are defined as corresponding to timing of switching currents for individual phases of the motor on the basis of signals from an angular-position detector provided on a driven member that is driven by a driving force transmitted from the sensorless motor.

After the setting, switching among a plurality of excitation phases is controlled according to signals from the angular-position detector.

However, according to the related art disclosed in Japanese Unexamined Patent Application Publication No. 2003-79184, until the rotation rate of the motor becomes sufficiently high so that an induced voltage can be used, it is difficult to drive the sensorless DC brushless motor by calculating timing of switching among excitation phases on the basis of induced voltage signals.

Since open-loop control is exercised, e.g., the rotation rate is not controlled on the basis of detection of angular velocity of rotation, a delay occurs when a feedback control mode is entered.

When a delay occurs in activation, in the case of a laser beam printer, a copying machine, or the like, the time of starting the first print job is delayed.

Even when activation takes a considerable time so that the temperature is raised sufficiently to allow fixing, it is desired to reduce it takes from receipt of a job instruction to output of a job product.

Thus, it is needed to reduce time for activation of the driving system. An analog circuit for detecting induced voltages is needed. This results in increased cost.

According to the related art disclosed in Japanese Patent No. 3690296, it is possible to start driving the motor without detecting induced voltages. However, at the time of activation, it is needed to recognize three predetermined or desired angular positions, so that a delay occurs in activation.

Error occurs in the predetermined or desired rotation angles due to the effect of friction torque, error occurs in estimated positions of the magnetic poles of the rotor relative to the actual positions thereof. This causes unstable operation.

When power is turned off, it is not allowed to recognize the phases of the magnetic poles accurately.

Thus, when power is turned on again, the rotor may be pulled to the predetermined or desired angular positions. This causes a delay in activation.

SUMMARY

One or more embodiments of the present patent application has been made, taking the above-mentioned circumstances into consideration.

At least one embodiment of the present patent application provides a driving control device for a brushless motor having a rotor and a plurality of coils with different phases. The driving control device includes a detection target that is configured to rotate in synchronization with rotation of the rotor and that has formed thereon a pattern representing modulation information, a detector configured to read the pattern and to thereby output modulated output signals, a demodulator configured to demodulate the output signals output from the detector and to thereby obtain demodulated information, and a controller configured to control rotation of the rotor on the basis of at least the demodulated information obtained by the demodulator.

The above-described driving control device may further include an output-signal-information detector configured to detect output-signal information regarding the output signals. With the above-described driving control device, the controller may detect an absolute angle of the rotor or positions of magnetic poles of the rotor on the basis of the demodulated information obtained by the demodulator and the output-signal information detected by the output-signal-information detector.

The detector may be a magnetic sensor, the detection target may have formed thereon a pattern of alternate N-pole magnetic regions and S-pole magnetic regions, and magnetic regions located in an area may have a width different from a width of magnetic regions located in another area.

The detector may be a reflection photosensor, the pattern formed on the detection target may include reflectors that are located alternately and that exhibit different brightnesses, and reflectors provided in an area may have a size different from a size of reflectors provided in another area.

The detector may include at least one transmission photosensor, the pattern formed on the detection target may include a plurality of slits, and some of the slits may have a size different from a size of other slits.

The above-described driving control device may further include a rotation-angle detector configured to detect a rotation angle of the rotor. With the above-described driving control device, when a current flows through a first coil, a current does not flow through a second coil and an induced voltage occurs on the second coil, and the rotation-angle detector detects the rotation angle of the rotor on the basis of the induced voltage.

The above-described driving control device may further include a pulse counter configured to count the number of the output pulses. With the above-described driving control device, the detector may be configured to read the pattern and to thereby output modulated output pulses, the demodulator may be configured to demodulate the output pulses output from the detector and to thereby obtain demodulated information, the controller may be configured to control rotation of the rotor on the basis of the demodulated information obtained by the demodulator and the number of the output pulses counted by the pulse counter, and the pattern may be formed so that output pulses having different pulse widths are output in association with different positions of the detection target.

The output pulses output from the detector may include a plurality of units each composed of a combination of short-period and long-period pulses.

The individual units may be composed of short-period and long-period pulses combined by different ratios.

The above-described driving control device may further include a binarizer configured to binarize the long-period pulses and the short-period pulses. With the above-described driving control device, the demodulator may determine whether an output pulse is a long-period pulse or a short-period pulse on the basis of a type of a binary code generated by the binarizer.

The detector may be a magnetic sensor, the detection target may have formed thereon a pattern of alternate N-pole magnetic regions and S-pole magnetic regions, and magnetic regions located in an area may have a width different from a width of magnetic regions located in another area.

The detector may a reflection photosensor, the pattern formed on the detection target may include reflectors that are located alternately and that exhibit different brightnesses, and reflectors provided in an area may have a size different from a size of reflectors provided in another area.

The detector may include at least one transmission photosensor, the pattern formed on the detection target may include a plurality of slits, and some of the slits may have a size different from a size of other slits.

The output pulses detected from the pattern information formed on the detection target may include a plurality of units each composed of a combination of short-period and long-period pulses, and magnetic-pole positions of the rotor may be detected.

The output pulses detected from the pattern information formed on the detection target may include a plurality of units each composed of a combination of short-period and long-period pulses, the individual units may be composed of short-period and long-period pulses combined by different ratios, and an absolute angle of the rotor may be detected.

The demodulator may use different reference values to determine whether an output pulse is a long-period pulse or a short-period pulse between acceleration or deceleration of the motor and constant rotation of the rotor.

The above-described driving control device may further include a binary-information storage unit configured to store binary information obtained by binarizing the long-period pulses and the short-period pulses, and an error-detection-information detector configured to check a difference between the binary information stored in the binary-information storage unit and binary information obtained by binarizing the output pulses detected by the detector.

The above-described driving control device may further include a rotation-angle detector configured to detect a rotation angle of the rotor. With the above-described driving control device, when a current flows through a first coil, a current does not flow through a second coil and an induced voltage occurs on the second coil, and the rotation-angle detector may detect the rotation angle of the rotor on the basis of the induced voltage.

At least one embodiment of the present patent application provides an image reading apparatus that includes an image reader configured to read an image of an original document, and one of first and second driving control devices for a brushless motor having a rotor and a plurality of coils with different phases. The first driving control device includes a detection target that is configured to rotate in synchronization with rotation of the rotor and that has the detection target having formed thereon a pattern representing modulation information, a detector configured to read the pattern and to thereby output modulated output signals, a demodulator configured to demodulate the output signals output from the detector and to thereby obtain demodulated information, an output-signal-information detector configured to detect output-signal information regarding the output signals, and a controller that is configured to control rotation of the rotor and that detects an absolute angle of the rotor or positions of magnetic poles of the rotor on the basis of the demodulated information obtained by the demodulator and the output-signal information detected by the output-signal-information detector. The second driving control device includes a detection target that is configured to rotate in synchronization with rotation of the rotor and that has formed thereon a pattern representing modulation information, a detector configured to read the pattern and to thereby output modulated output pulses, a demodulator configured to demodulate the output pulses output from the detector and to thereby obtain demodulated information, a pulse counter configured to count the number of the output pulses, and a controller configured to control rotation of the rotor on the basis of the demodulated information obtained by the demodulator and the number of the output pulses counted by the pulse counter, in which the pattern is formed so that output pulses having different pulse widths are output in association with different positions of the detection target.

At least one embodiment of the present patent application provides an image forming apparatus that includes an image carrier configured to carry an electrostatic latent image, a transferring unit configured to transfer a toner image on the image carrier to a transferring material, and a transporting unit configured to transport the transferring material. With the image forming apparatus, each of the image carrier, the transferring unit, and the transporting unit includes one of first and second driving control devices for a brushless motor having a rotor and a plurality of coils with different phases. The first driving control device includes a detection target that is configured to rotate in synchronization with rotation of the rotor and that has the detection target having formed thereon a pattern representing modulation information, a detector configured to read the pattern and to thereby output modulated output signals, a demodulator configured to demodulate the output signals output from the detector and to thereby obtain demodulated information, an output-signal-information detector configured to detect output-signal information regarding the output signals, and a controller that is configured to control rotation of the rotor and that detects an absolute angle of the rotor or positions of magnetic poles of the rotor on the basis of the demodulated information obtained by the demodulator and the output-signal information detected by the output-signal-information detector. The second driving control device includes a detection target that is configured to rotate in synchronization with rotation of the rotor and that has formed thereon a pattern representing modulation information, a detector configured to read the pattern and to thereby output modulated output pulses, a demodulator configured to demodulate the output pulses output from the detector and to thereby obtain demodulated information, a pulse counter configured to count the number of the output pulses, and a controller configured to control rotation of the rotor on the basis of the demodulated information obtained by the demodulator and the number of the output pulses counted by the pulse counter, in which the pattern is formed so that output pulses having different pulse widths are output in association with different positions of the detection target.

BRIEF DESCRIPTION OF THE DRAWINGS

The accompanying drawings are intended to depict example embodiments of the present invention and should not be interpreted to limit the scope thereof. The accompanying drawings are not to be considered as drawn to scale unless explicitly noted.

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXAMPLE EMBODIMENTS

Figure 1:
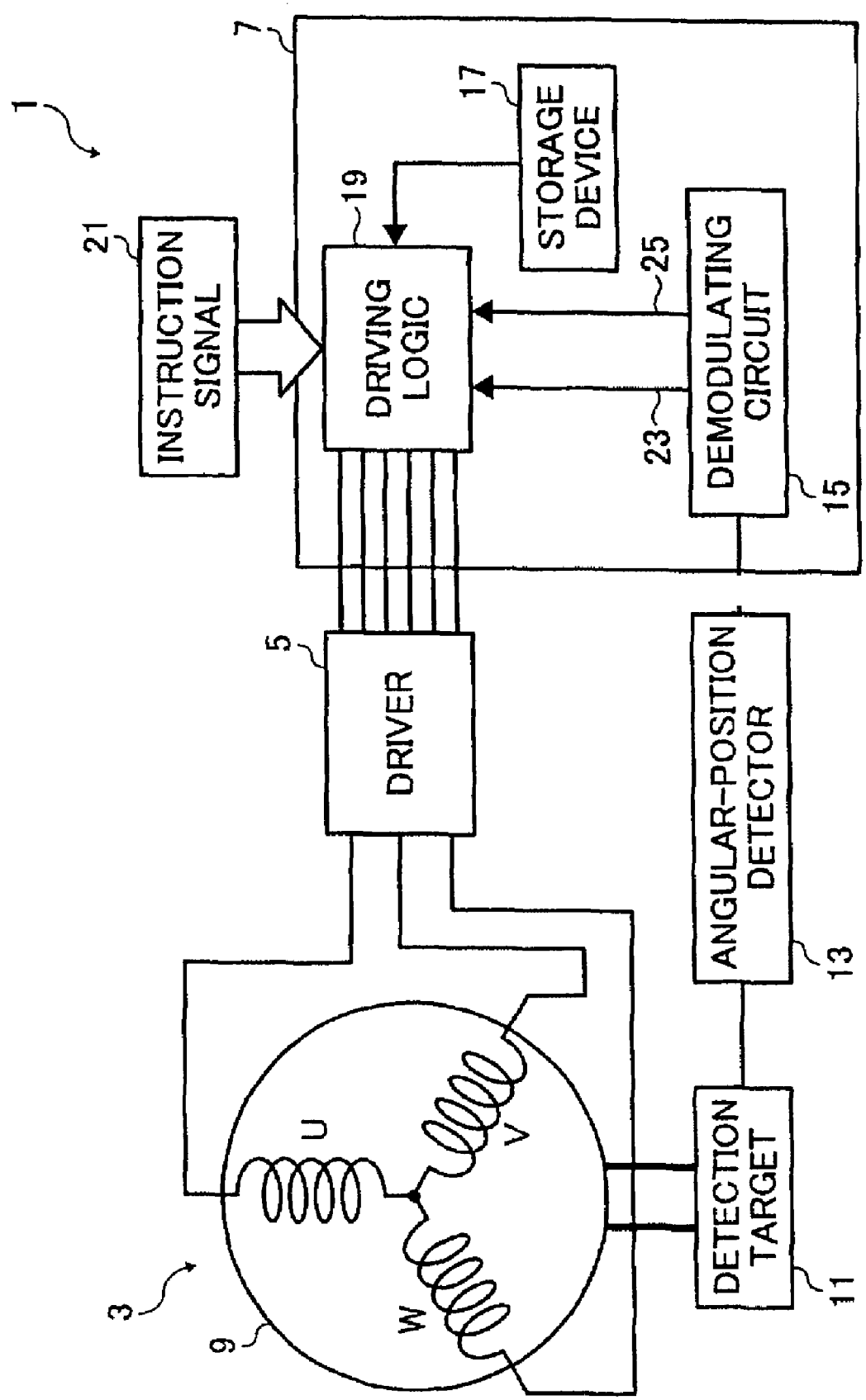
FIG. 1 is a diagram showing a control circuit of a motor driving device according to example embodiments of the present invention.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to described various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, example embodiments of the present patent application are described.

Now, embodiments of the present invention will be described in detail with reference to the accompanying drawings.

FIG. 1 is a diagram showing a motor driving control device according to example embodiments of the present invention.

Figure 2:
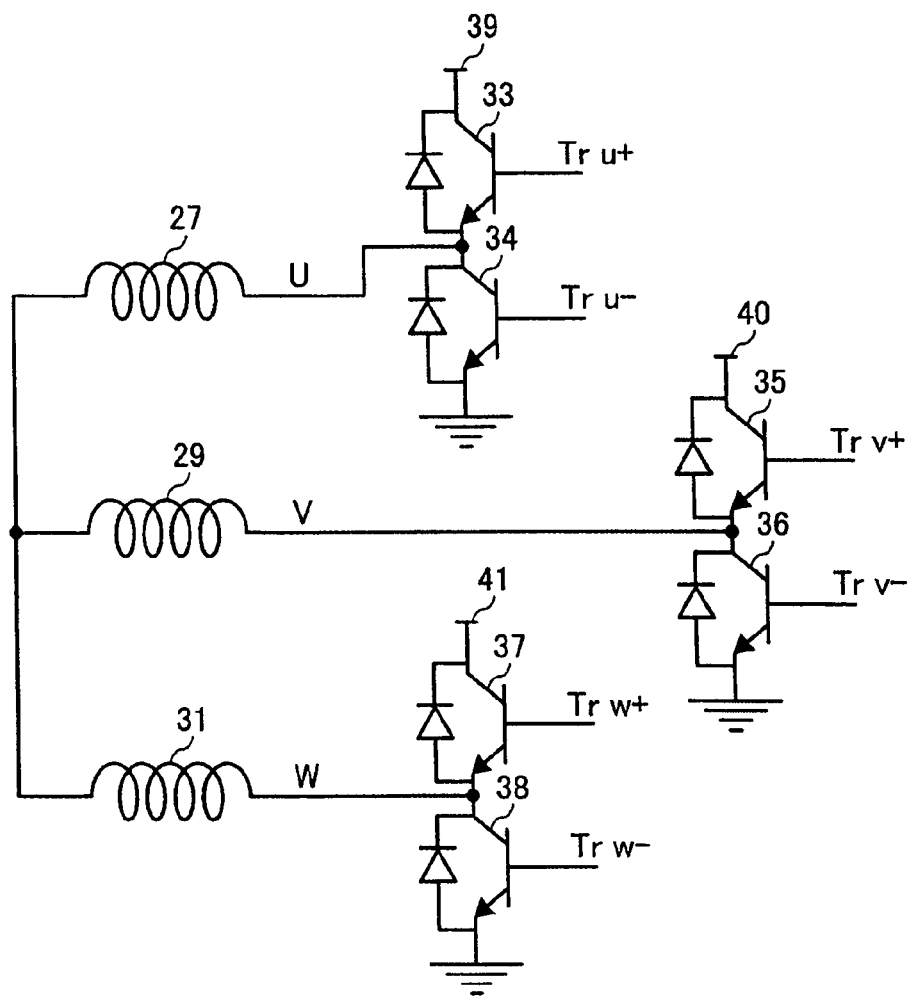
FIG. 2 is an electrical circuit diagram of coils shown in FIG. 1.

FIG. 2 is an electrical circuit diagram of coils shown in FIG. 1.

Figure 3:
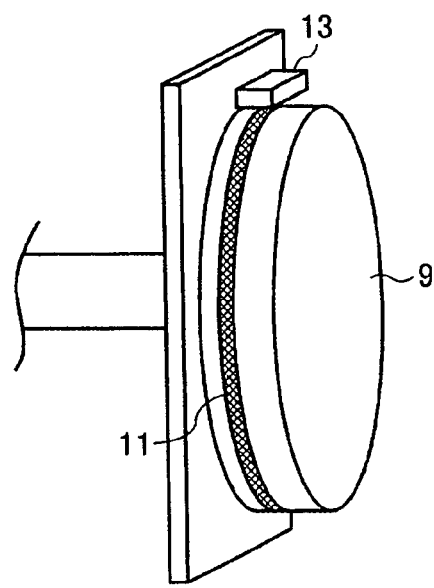
FIG. 3 is a perspective view showing the configuration of a rotor and an angular-position detector shown in FIG. 1.

FIG. 3 is a perspective view showing the configuration of a rotor and an angular-position detector shown in FIG. 1.

Figure 4A:
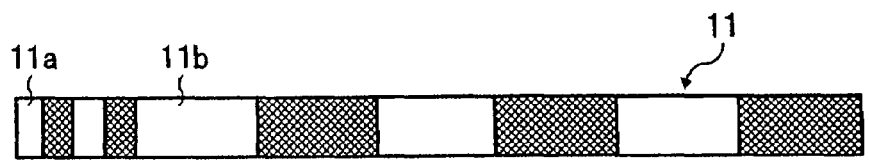
FIGS. 4A and 4B are schematic diagrams showing a scale provided on the outer circumferential surface of the rotor shown in FIG. 3.
Figure 4B:
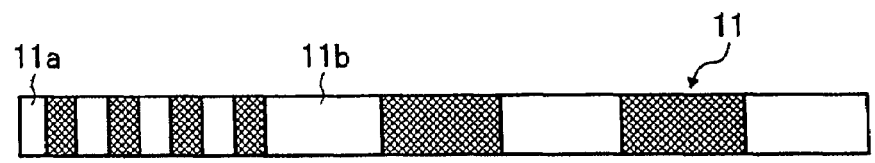

FIGS. 4A and 4B are schematic diagrams showing scales formed on a detection target provided on the outer circumferential surface of the rotor shown in FIG. 3.

Figure 5A:
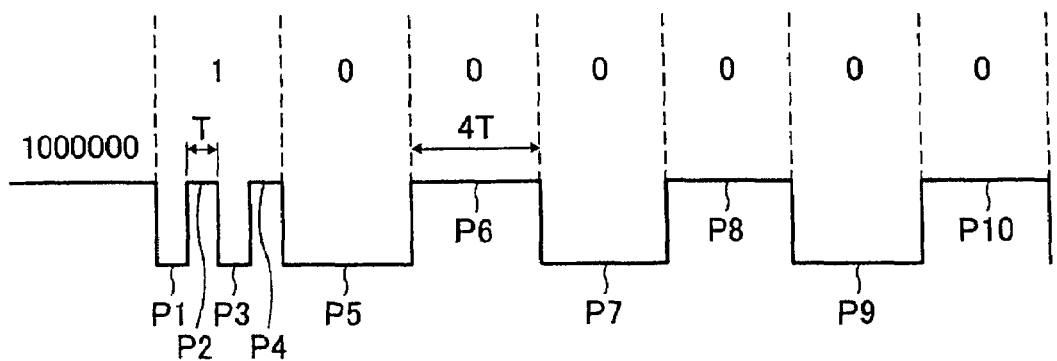
FIGS. 5A and 5B are timing charts showing pulses that are output when the scale is read by the angular-position detector.
Figure 5B:
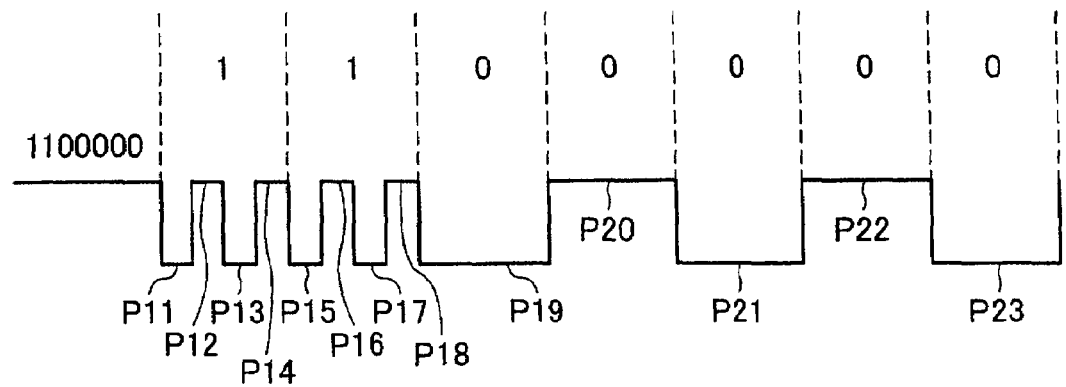

FIGS. 5A and 5B are timing charts of pulses that are output when the scales are read by the angular-position detector.

Figure 6:
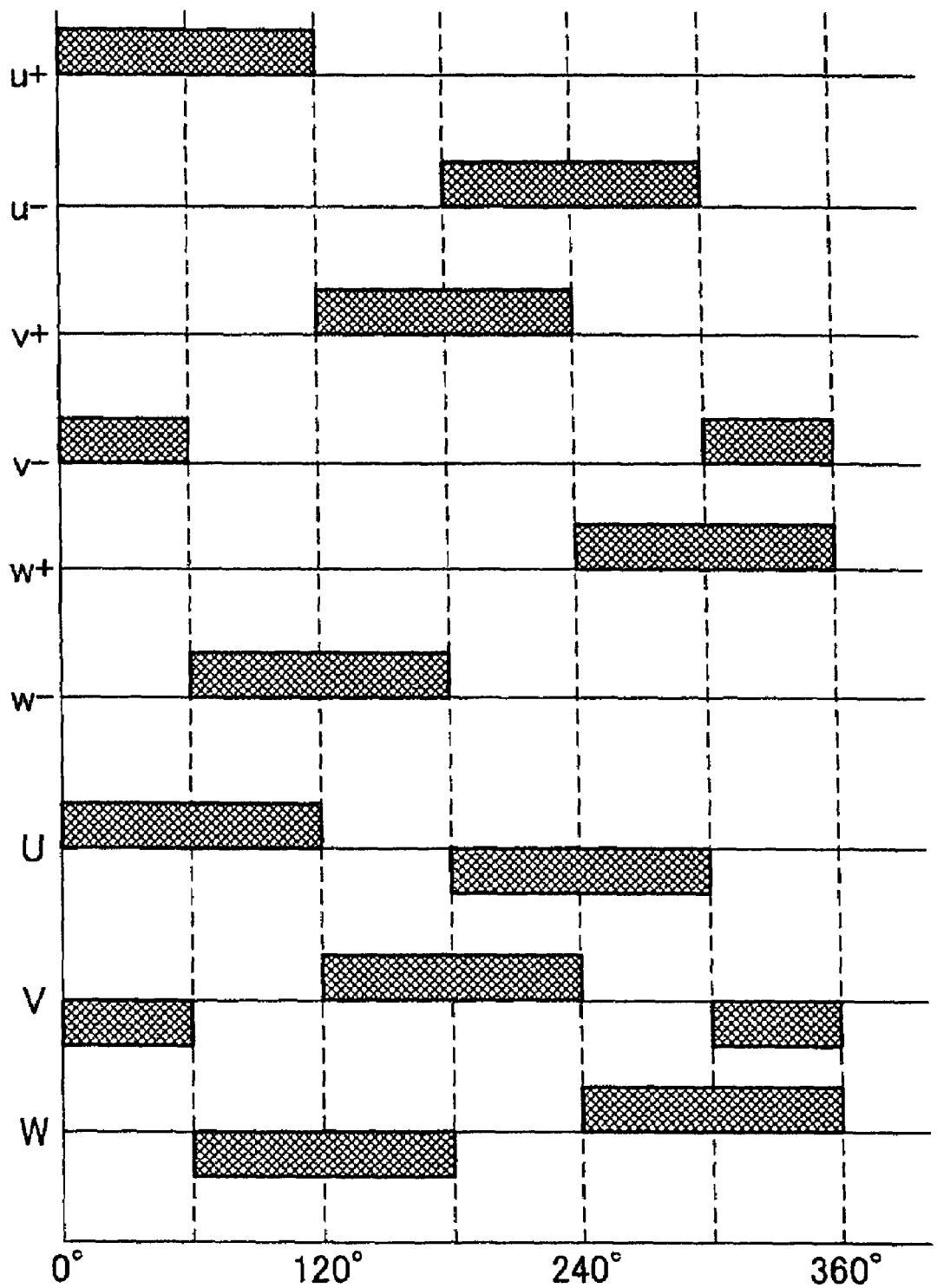
FIG. 6 is a timing chart of currents that flow through individual coils of the motor driving device according to example embodiments.

FIG. 6 is a timing chart of currents that flow through the individual coils of the motor driving control device according to example embodiments.

Referring to FIG. 1, a motor driving control circuit (driving control device) 1 according to the first embodiment may be used to drive a sensorless DC brushless motor (hereinafter, simply referred to as a brushless motor) 3.

The brushless motor 3 may be a three-phase brushless motor having three star-connected coils (stator windings) individually associated with a U phase, a V phase, and a W phase (simply indicated as U, V, and W in FIG. 1).

The driving control circuit 1 may include a driver 5 and a controller 7.

The driver 5 may have output terminals individually connected to terminals of the U-phase, V-phase, and W-phase coils. The driver 5 may be connected to a power supply for driving the brushless motor 3.

The driver 5 may include three sets of a connected pair of a power-supply-side transistor and a ground-side transistor, individually associated with the U phase, the V phase, and the W phase.

Thus, six transistors in total may be controlled to turn on or turn off according to switching signals supplied from the controller 7, whereby the coils of the individual phases may be sequentially excited so that a rotor 9 of the brushless motor 3 can be driven to rotate.

On the rotor 9 (or on a rotation shaft), a detection target 11 that rotates in synchronization with the rotor 9 may be provided.

The detection target 11 may have a magnetic pattern formed thereon, which may be used for detection by an angular-position detector (detector) 13 implemented by a magnetic-effect detector.

Alternatively, the detection target 11 may be provided on a rotating member that is driven by the brushless motor 3 via a gear mechanism or the like, instead of being provided coaxially with the rotor 9 or the rotation shaft.

The controller 7 may include, for example, a microcomputer, a demodulating circuit 15, a storage device 17, and/or driving logic 19.

The demodulating circuit 15 will be described later.

The storage device 17 may be used to store an angular error of detected absolute-angle information or magnetic-pole-position information with respect to actual positions of magnetic poles of the rotor 9 of the brushless motor 3.

The controller 7 may receive input of a modulated angular-position detection signal from the angular position detector 13.

The controller 7 may include the driving logic 19 that individually controls ON/OFF of the transistors of the driver 5.

The driving logic 19 may control ON/OFF switching of the transistors in synchronization with intended timings of switching among the coils of the individual phases so that the brushless motor 3 may be rotated at a rotation rate specified by an instruction signal 21 from an upper layer device.

By outputting signals for the switching among the U-phase, V-phase, and W-phase coils of the brushless motor 3 to the driver 5, the coils may be sequentially excited by appropriate switching, whereby the brushless motor 3 may be rotated appropriately.

In the controller 7, the demodulating circuit 15 may receive the modulated angular-position detection signal input from the angular-position detector 13, and outputs magnetic-pole information 23 and angular-position information 25 to the driving logic 19.

On the basis of the magnetic-pole information 23 and the angular-position information 25, rotation-angular-velocity information or rotation-angle information and magnetic-pole information of the rotor 9 may be obtained in real time.

Then, the information obtained may be compared with a reference angular velocity or a reference angle specified by the instruction signal 21, and a PWM (pulse width modulation) signal corresponding to the error is generated. This signal may be ANDed with the signals for controlling ON/OFF of the individual transistors of the driver 5, thereby controlling the angular velocity of rotation of the brushless motor 3.

For the purpose of driving the three-phase brushless motor 3, as shown in FIG. 2, the U-phase coil 27, the V-phase coil 29, and the W-phase coil 31 may be connected to switching transistors 33 and 34, switching transistors 35 and 36, and switching transistors 37 and 38, respectively, and terminals 39, 40, and 41 may be connected to the positive power supply side.

Next, switching of currents that flow through the coils in the two-pole three-phase configuration will be described.

In FIG. 6, "u+" may denote a signal for the transistor connected to the U-phase coil 27 on the positive power supply side, which corresponds to the switching transistor in FIG. 2.

"u−" may denote a signal for the transistor connected to the U-phase coil 27 on the ground side, which may correspond to the switching transistor 34 in FIG. 2.

Similarly, "v+" may correspond to the switching transistor 35, "v−" may correspond to the switching transistor 36, "w+" may correspond to the switching transistor 37, and "w−" may correspond to the switching transistor 38.

In FIG. 6, the U-phase coil 27 and the V-phase coil 29 may be first excited in mutually opposite directions. For example, the switching transistors 33 and 36 may be turned on so that a current may flow from the terminal 39 connected to the positive power supply side to the ground through the switching transistor 33, the U-phase coil 27, the V-phase coil 29, and the switching transistor 36, whereby the U-phase coil 27 and the V-phase coil 29 may be excited. The state described above may correspond to the section of the motor rotation angle of 0 to 60 degrees in FIG. 6.

In the next state, the switching transistors 33 and 38 may be turned to ON. In this state, a current may flow from the terminal 39 to the ground through the switching transistor 33, the U-phase coil 27, the W-phase coil 31, and the switching transistor 38, whereby the U-phase coil 27 and the W-phase coil 31 may be excited. This state may correspond to the section of the motor rotation angle of 60 to 120 degrees in FIG. 6.

In the next state, the switching transistors 35 and 38 may be turned to ON. In this state, a current may flow from the terminal 40 to the ground through the switching transistor 35, the V-phase coil 29, the W-phase coil 31, and the switching transistor 38, whereby the V-phase coil 29 and the W-phase coil 31 may be excited. This state may correspond to the section of the motor rotation angle of 120 to 180 degrees in FIG. 6.

In the next state, the switching transistors 35 and 34 may be turned to ON. In this state, a current may flow from the terminal 40 to the ground through the switching transistor 35, the V-phase coil 29, the U-phase coil 27, and the switching transistor 34, whereby the V-phase coil 29 and the U-phase coil 27 may be excited. This state may correspond to the section of the motor rotation angle of 180 to 240 degrees.

In the next state, the switching transistors 37 and 34 may be turned to ON. In this state, a current may flow from the terminal 41 to the ground through the switching transistor 37, the W-phase coil 31, the U-phase coil 27, and the switching transistor 34, whereby the W-phase coil 31 and the U-phase coil 27 may be excited. This state may correspond to the section of the motor rotation angle of 240 to 300 degrees in FIG. 6.

In the next state, the switching transistors 37 and 36 may be turned to ON. In this state, a current may flow from the terminal 41 to the ground through the switching transistor 37, the W-phase coil 31, the U-phase coil 27, and the switching transistor 36, whereby the W-phase coil 31 and the V-phase coil 29 may be excited. This state may correspond to the section of the motor rotation angle of 300 to 360 degrees.

The six steps described above may result in one rotation of the motor.

The motor may continue rotation by repeating the six steps, starting from the section of 0 to 60 degrees.

Next, the angular-position detector 13 will be described.

In example embodiments, the angular-position detector 13 may be implemented by an MR sensor, which may be a typical type of magnetic-effect detector.

As shown in FIG. 3, a magnetic unit (detection target) 11 having a magnetic pattern of alternate N and S magnetized regions may be provided on the outer circumferential surface of the rotor 9, and an MR sensor 13 may be provided opposing the magnetic unit 11 at a predetermined or desired distance.

The MR sensor 13 may include a ferromagnetic magnetoresistive element whose resistance may change according to the intensity of a magnetic field applied thereto, so that the MR sensor 13 may acquire signals in accordance with the magnetic pattern on the magnetic unit 11.

Although the magnetic unit 11 may be provided on the outer circumferential surface of the rotor 9 in example embodiments, the magnetic unit 11 may be provided on any other part that rotates in synchronization with the rotor 9.

Next, pulses that may be output in response to detection of the magnetic pattern on the magnetic unit 11 by the MR sensor 13 will be described.

FIGS. 4A and 4B show scales formed of the magnetic unit 11 provided on the outer circumferential surface of the rotor 9.

As shown in FIGS. 4A and 4B, magnetic regions 11a and magnetic regions 11b having mutually different widths may be provided.

When the scales on the magnetic unit 11 are read by the MR sensor 13, pulses shown in FIGS. 5A and 5B may be output.

In the examples shown in FIGS. 5A and 5B, when the period of a short-period pulse is T, the period of a long-period pulse can be expressed as 4T.

Although a pulse period can be measured in terms of an interval between a rising edge and a next rising edge or an interval between a falling edge and a next falling edge, in example embodiments, a pulse width may be measured in terms of an interval between a rising edge and a falling edge or an interval between a falling edge and a rising edge.

For example, data representing a value measured by a time measurement counter may be captured upon detection of each rising or falling edge. Immediately after data associated with an edge is captured, the time measurement counter may be cleared, and time measurement by the time measurement counter may start again.

The time measurement counter may be incremented on the basis of a clock fc having a predetermined or desired frequency. That is, pulse-period data may be captured and pulse-period measurement may be started upon detection of each rising or falling edge.

Thus, referring to FIG. 5A, when the motor is rotated an a constant angular velocity and an output pulse p1 is output, the time measurement counter may take on a count value of Nx1 (natural number).

When the time width of a short-period pulse interval is denoted by $T_0$, the time measurement counter may take on a count value of $T_0 \cdot fc_0 = N_c$ (natural number). That is, the time measurement counter may take on a value of $N_c$ at time $T_0$.

When the motor is controlled to rotate at a constant angular velocity, it is known in which range the time width of shorter pulse may fall in, e.g., in which range the count value of measurement of the short-period pulse falls in, so that it is possible to determine that the pulse 1 is a short-period pulse on the basis of the count value Nx1 (natural number) obtained by the measurement of the pulse p1.

When the angular velocity of the motor fluctuates, variation may occur in the time T or the count value Nx.

For example, when the angular velocity fluctuates by ±50%, the count value can take on a maximum value of 2.0Nc (when the angular velocity varies by −50%) on the shorter-period side and a minimum value of 2.7Nc (when the angular velocity varies by +50%) on the longer-period side.

Thus, correct determination can be achieved by choosing an intermediate value of 2.4Nc (a natural number most approximate to this value) as a threshold.

These values may have the relationship of $Nx = T \cdot fc = k \cdot fc/\omega$ (k is a constant, and ω is the angular velocity of rotation of the motor) on the short-period side, and when $\omega = 0.5\omega_0$ ($\omega_0$ is a target angular velocity of rotation), $Nx = kfc/0.5\omega_0 = 2(k \cdot fc/\omega_0) = 2Nc$.

These values may have the relationship of $Nx = 4T \cdot fc = 4k \cdot fc/\omega$ on the long-period side, and since $\omega = 1.5\omega_0$, $Nx = 4k \cdot fc/1.5\omega_0 = 2.7(k \cdot fc/\omega_0) = 2.7N_c$.

In ordinary frequency modulation, the longer period may be only twice as long as the shorter period under rotation at a constant angular velocity.

Thus, on the longer-period side, according to the relationship of $Nx = 2T \cdot fc = 2k \cdot fc/\omega$, $Nx = 1.3N_c$ when $\omega = 1.5\omega_0$, which is smaller than 2Nc for the shorter period, so that incorrect determination may occur.

When it is needed to allow demodulation even when the angular velocity varies by a larger amount, absolute-angle information or magnetic-pole information may be represented on the magnetic unit 11 on the outer surface of the rotor 9 in such a modulated form that short-period pulses and long-period pulses may have periods with a ratio of 1:5.

Regarding a next pulse p2, although the pulse p2 starts with a rising edge and ends with a falling edge as opposed to the pulse p1 starting with a falling edge and ending with a rising edge, the pulse p2 may be measured by the counter similarly to the pulse p1. Thus, when the motor is rotating at a constant angular velocity, the time measurement counter may take on a count value of Nx2 (natural number).

When the motor is controlled to rotate at a constant angular velocity, it is known in which range a count value obtained by measuring a time width of a short-period pulse may fall, so that it is possible to determine that the pulse p2 is a short-period pulse on the basis of the count value Nx2 (natural number).

For a next pulse p3, similarly to the case of the pulse p1 described above, a count value Nx3 (natural number) from a falling edge to a rising edge may be measured.

For a next pulse p4, similarly to the case of the pulse p2 described above, a count value Nx4 (natural number) from a rising edge to a falling edge may be measured.

When the motor is rotating at a constant rotation rate, the possible range of these count values obtained by measuring short-period pulses is known.

Thus, the pulses p3 and p4 can be determined as short-period pulses.

Upon completion of the measurement of the pulse p4, the number of short-period pulses that have been counted (the number of times of clearing) may reach four, which may correspond to a base period having the same width as a long-period pulse.

Thus, rotation angle of the rotor 9 may be measured using a falling edge of the pulse p4. To this base period, a code "1" is assigned.

On the other hand, regarding a pulse p5, the time measurement counter may obtain a count value of Nx5 (natural number) corresponding to an interval from a falling edge to a rising edge.

When the motor is rotating at a constant rotation rate, the time measurement counter may obtain a count value of $4T_0 \cdot fc = 4N_e$, where T0 may denote the period of a short-period pulse and 4T0 may denote the period of a long-period pulse.

That is, the time measurement counter may obtain a count value of $4N_e$ when the measured time is $4T_0$.

When the motor is rotating at a constant rotation rate, a possible range of the time width of a long-period pulse, e.g., a possible range of count value obtained by measurement of a long-period pulse. Thus, the pulse p5 can be determined as a long-period pulse on the basis of the count value Nx5 (natural number) obtained by measurement of the pulse p5.

Upon completion of measurement of the pulse p5, since it is recognized that a long-period pulse has been detected, the rotation angle of the rotor 9 may be measured using the rising edge of the pulse p5. To this base period, a code "0" is assigned.

Regarding pulses p6 to p10, similarly to the case of the pulse p5, when the respective pulses are counted, the time measurement counter may obtain count values of Nx6 to Nx10 (natural numbers).

When the motor is rotating at a constant rotation rate, a possible range in which the count values Nx6 to Nx10 fall in is known. Thus, the pulses p6 to p10 can be determined as long-period pulses.

Since the pulses p6 to p10 are long period pulses, upon completion of measurement of each of the pulses p6 to p10, the rotation angle of the rotor 9 may be measured using a rising edge or a falling edge. To these base periods, codes "0" may be assigned.

Through the measurement described above, each pulse may be determined as a short-period pulse or a long-period pulse. A code "1" may be assigned when four short-period pulses are counted in a base period, while a code "0" is assigned to a base period in which one long-period pulse is detected.

Rotation-angle information of the rotor 9 can be obtained using rising or falling edges at the timings of switching between the codes.

In the example shown in FIG. 5A, "1000000" is obtained as magnetic-pole position information or absolute-angle information obtained at intervals corresponding to long-period pulses.

Next, measurement based on the scale shown in FIG. 4B will be described.

Upon measurement of a pulse p1, the time measurement counter may obtain a count value of Nx11 (natural number).

When the motor is rotating at a constant rotation rate, a possible range of a count value obtained by measuring the time width of a short-period pulse is known. Thus, on the basis of the count value Nx11 (natural number) obtained by measurement of the pulse p1, the pulse p1 can be determined as a short-period pulse.

Similarly, regarding a pulse p12, on the basis of a count value of Nx12 (natural number) obtained by the time measurement counter, the pulse p12 can be determined as a short-period pulse.

Similarly, pulses p13 and p14 can be determined as short-period pulses.

Upon completion of measurement of the pulse p14, the number of counted short-period pulses (e.g., the number of times of clearing) may become four, which may correspond to one base period (with a length of one long-period pulse).

Thus, the rotation angle of the rotor 9 may be measured using the falling edge of the pulse p14. To this base period, a code "1" may be assigned.

Similarly, regarding pulses p15 to p18, the time measurement counter may obtain count values of Nx15 to Nx18 (natural numbers), and the pulses p15 to p18 are determined as short-period pulses on the basis of the count values Nx15 to Nx18.

Upon completion of measurement of the pulse p18, the number of counted short-period pulses (e.g., the number of times of clearing) may become four, which corresponds to a base period (having the same length as one long-period pulse).

Thus, the rotation angle of the rotor 9 may be measured using the falling edge of the pulse p18. To this base period, a code "1" is assigned.

Then, for a pulse p19, the time measurement counter may obtain a count value Nx19 (natural number) by measuring the interval between a falling edge and a rising edge.

When the motor is rotating at a constant rotation rate, a possible range of the time width of a long-period pulse is known.

Thus, on the basis of the count value Nx19 (natural number) obtained by measurement of the pulse p19, the pulse p19 can be determined as a long period pulse.

Upon completion of measurement of the pulse p19, it is recognized that a long-period pulse has been detected, so that the rotation angle of the rotor 9 may be measured using the rising edge of the pulse p19. To this base period, a code "0" is assigned.

When pulses p20 to p23 are counted, similarly to the case of the pulse p19, the time measurement counter may obtain count values of Nx20 to Nx23 (natural numbers).

On the basis of the count values Nx20 to Nx23, the pulses p20 to p23 may be determined as long-period pulses.

Since the pulses p20 to p23 are long-period pulses, upon completion of detection of each of the pulses p20 to p23, the rotation angle of the rotor 9 may be measured using a rising edge or a falling edge. To these base periods, codes "0" may be assigned.

Through the measurement described above, each pulse may be determined as a short-period pulse or a long-period pulse.

A code "1" may be assigned when four short-period pulses are counted in a base period, while a code "0" is assigned to a base period in which one long-period pulse is detected.

Rotation-angle information of the rotor 9 can be obtained using rising or falling edges at the timings of switching between the codes.

In the example shown in FIG. 5B, "1100000" may be obtained as magnetic-pole position information or absolute-angle information obtained at intervals corresponding to long-period pulses.

Next, a method of detecting positions of magnetic poles of the rotor 9 will be described.

The following description will be given in the context of the rotor 9 having two-pole three-phase magnetic-pole positions.

In this case, regarding the switching transistors 33 and 34, first, the switching transistor 33 may be maintained ON over a section of a rotation angle of 120 degrees, whereby a current may flow in one direction.

Then, after a section in which the switching transistors 33 and 34 are both OFF, the switching transistor 34 may be maintained ON over a section of a rotation angle of 120 degrees, whereby a current may flow in the opposite direction.

Then, in a subsequent section of a rotation angle of 60 degrees, again, both the transistors 33 and 34 may be maintained OFF.

The switching transistors 35 and 36 and the switching transistors 37 and 38 may be controlled similarly to the switching transistors 33 and 34.

The coils of the individual phases may be driven by repeating this sequence for one cycle, with phase differences in rotation angle among the individual phases.

Thus, as shown in FIG. 6, the driving states of the coils of the individual phases may be switched on the basis of 60-degree sections of rotation angle.

Therefore, in order to allow recognition of points (six points in this example) of switching the driving states of the coils of the individual phases so that the motor can be rotated appropriately on the basis of the positions of the magnetic poles of the rotor 9, code may be formed using different periods of alternation between N and S regions on the magnetic unit 11 that rotates in synchronization with the rotor 9.

A long-period code using 7-bit codewords may be constructed so that the six magnetic-pole positions of the rotor 9 at which the driving states of the coils of the individual phases are to be switched can be recognized, and successive six pieces of magnetic-position information are represented by codewords as shown in Table 1 below:

TABLE 1

| | MSB | | | | | | LSB |
|---|---|---|---|---|---|---|---|
| 1 | 1 | 0 | 0 | 0 | 0 | 0 | 0 |
| 2 | 1 | 1 | 0 | 0 | 0 | 0 | 0 |
| 3 | 1 | 1 | 1 | 0 | 0 | 0 | 0 |
| 4 | 1 | 1 | 1 | 1 | 0 | 0 | 0 |
| 5 | 1 | 1 | 1 | 1 | 1 | 0 | 0 |
| 6 | 1 | 1 | 1 | 1 | 1 | 1 | 0 |

When the code is detected, signals may be detected serially from the MSB (most significant bit) side to the LSB (least significant bit) side.

The detection positions of "0" on the LSB side may be arranged to correspond to the positions of switching the driving states.

Since only one codeword is included in a section of rotation angle of 60 degrees, the number of pulses per rotation is 7×6=42.

When a high resolution of angle information is needed, a plurality of codewords may be included in a section of rotation angle of 60 degrees so that a sufficient resolution of angle information can be achieved.

Table 2 below shows an example where three codewords are included in a section of rotation angle of 60 degrees.

In this case, a high resolution of 7×6×3=126 pulses per rotation can be achieved.

TABLE 2

| | MSB | | | | | | | | | | | | | | | | | | | | LSB |
|---|---|---|---|---|---|---|---|---|---|---|---|---|---|---|---|---|---|---|---|---|---|
| 1 | 1 | 0 | 0 | 0 | 0 | 0 | 0 | 1 | 0 | 0 | 0 | 0 | 0 | 0 | 1 | 0 | 0 | 0 | 0 | 0 | 0 |
| 2 | 1 | 1 | 0 | 0 | 0 | 0 | 0 | 1 | 1 | 0 | 0 | 0 | 0 | 0 | 1 | 1 | 0 | 0 | 0 | 0 | 0 |
| 3 | 1 | 1 | 1 | 0 | 0 | 0 | 0 | 1 | 1 | 1 | 0 | 0 | 0 | 0 | 1 | 1 | 1 | 0 | 0 | 0 | 0 |
| 4 | 1 | 1 | 1 | 1 | 0 | 0 | 0 | 1 | 1 | 1 | 1 | 0 | 0 | 0 | 1 | 1 | 1 | 1 | 0 | 0 | 0 |
| 5 | 1 | 1 | 1 | 1 | 1 | 0 | 0 | 1 | 1 | 1 | 1 | 1 | 0 | 0 | 1 | 1 | 1 | 1 | 1 | 0 | 0 |
| 6 | 1 | 1 | 1 | 1 | 1 | 1 | 0 | 1 | 1 | 1 | 1 | 1 | 1 | 0 | 1 | 1 | 1 | 1 | 1 | 1 | 0 |

On the basis of a data sequence defined as described above, for example, when one codeword of binarized information may be included in a section of rotation angle of 60 degrees, a transition from a code "0" to a code "1" may correspond to a position of starting detection of one codeword of magnetic-pole information.

That is, it is possible to recognize the start position of each codeword of binarized information without adding synchronization information.

After the LSB of one codeword of magnetic-pole information is detected, it is possible to classify the current position into one of the six magnetic-pole positions.

Thus, paths of currents flowing through the coils of the individual phases can be switched immediately after detection of the LSB.

This allows accurate detection of the magnetic-pole positions of the rotor, and therefore allows appropriate rotation of the motor.

That is, with each codeword composed of 7 bits, after a transition from "1" to "0", "1" may not occur until after the end of 7 bits (the LSB of the codeword).

Thus, by detecting a transition from a code "0" to a code "1" as the first bit (MSB) of a codeword, synchronization can be achieved reliably.

When each piece of binarized information is composed of a plurality of codewords (e.g., three codewords), paths of currents that may flow through the coils of the individual phases of the motor may be switched at timings of detection of the LSB code "0" of the last (third) codeword.

That is, current paths are switched when three codewords representing the same magnetic-pole position have been detected, for example, after detection of the LSB code "0" of the third codeword.

At this time, in order to measure the same repeated data sequence three times, a counter may be provided.

At the time of activation, it is not always possible to detect the same data sequence three times.

Thus, switching of current paths on the basis of magnetic-pole-position information may be started when the same data sequence is successfully measured three times.

Accordingly, it is possible to detect magnetic-pole positions of the rotor reliably while achieving a sufficient resolution.

Although the current paths are switched in synchronization with transition of binarized information, the current paths may be switched in synchronization with other timings as long as the relationship between the timings and the magnetic-pole positions of the rotor 9 is clear.

Next, an operation of the demodulating circuit 15, which is effective when the rotation rate changes considerably, such as activation from an inactive state or deactivation from a constant rotation rate, will be described with reference to FIG. 7.

Input pulses 43 sequentially detected by the angular-position detector 13 may be differentiated by a differentiating circuit 44 at rising edges and falling edges.

The output pulses differentiated by the differentiating circuit 44 may be input to a reset terminal of a counter 45, whereby the counter is cleared (set to "0").

The differentiated output pulses may be input to a clock terminal in order to set counter outputs to a register 46.

The counter 45 may be counted up on the basis of a clock output from an oscillator that generates pulses of a predetermined or desired frequency.

To the register 46, data of the counter 45 that has been counted up until immediately before the counter 45 may be cleared is set.

Thus, the counter 45 may perform counting in accordance with the time widths of the input pulses 43.

The count value of an n-th pulse will be denoted as $C_n$ (n is a natural number).

Now, the definition of a pulse width will be described.

A pulse width can be defined using both an interval between a rising edge and a falling edge or an interval between a falling edge and a rising edge, or using an interval between a rising edge and a next rising edge or an interval between a falling edge and a next falling edge.

In example embodiments, a pulse width may be defined using both an interval between a rising edge and a falling edge or an interval between a falling edge and a rising edge.

Next, a demodulation method that is effective when the rotation rate changes considerably will be described.

This method may be based on comparison of pulse widths with adjacent pulses.

The following description will be given in the context of an example where the ratio of the periods of a short-period pulse and a long-period pulse is 1:4.

In carrying out demodulation, a transition from a short-period pulse to a long-period pulse may be detected when the current pulse width is greater than or equal to twice the previous pulse width, and a transition from a long-period pulse to a short-period pulse may be detected when the current pulse width is less than or equal to one half the previous pulse width.

By saving outputs from the counter 45 in the register 46, a count value $C_{n-1}$ of a past (n–1)-th pulse can be saved. The count value $C_{n-1}$ of the (n–1)-th pulse, obtained from the register 46, is multiplied by Z (Z=2 herein) by a first multiplier 47, and is multiplied by D (D=0.5 herein) by a second multiplier 48, and the results of multiplication are output.

Then, the results of multiplication may be compared with the count value $C_n$ of the n-th pulse width.

That is, a first comparator 49 checks $C_n > Z \cdot C_{n-1}$, and a second comparator 50 checks $C_n < D \cdot C_{n-1}$.

The outputs from the first comparator 49 and the second comparator 50 may be input to AND gates 51, 52, and 53, and outputs from the differentiating circuit 44 may also be input to the AND gates 51, 52, and 53.

The AND gate 51 may output a pulse indicating detection of a transition from a short pulse width to a long pulse width when the current count value is greater than or equal to Z=2 times the previous count value.

The AND gate 52 may output a pulse indicating detection of a transition from a long pulse width to a short pulse width when the current count value is less than or equal to D=0.5 times the previous count value.

The AND gate 53 may output a pulse indicating that a long or short pulse width is maintained in neither of the above two cases.

Figure 7:
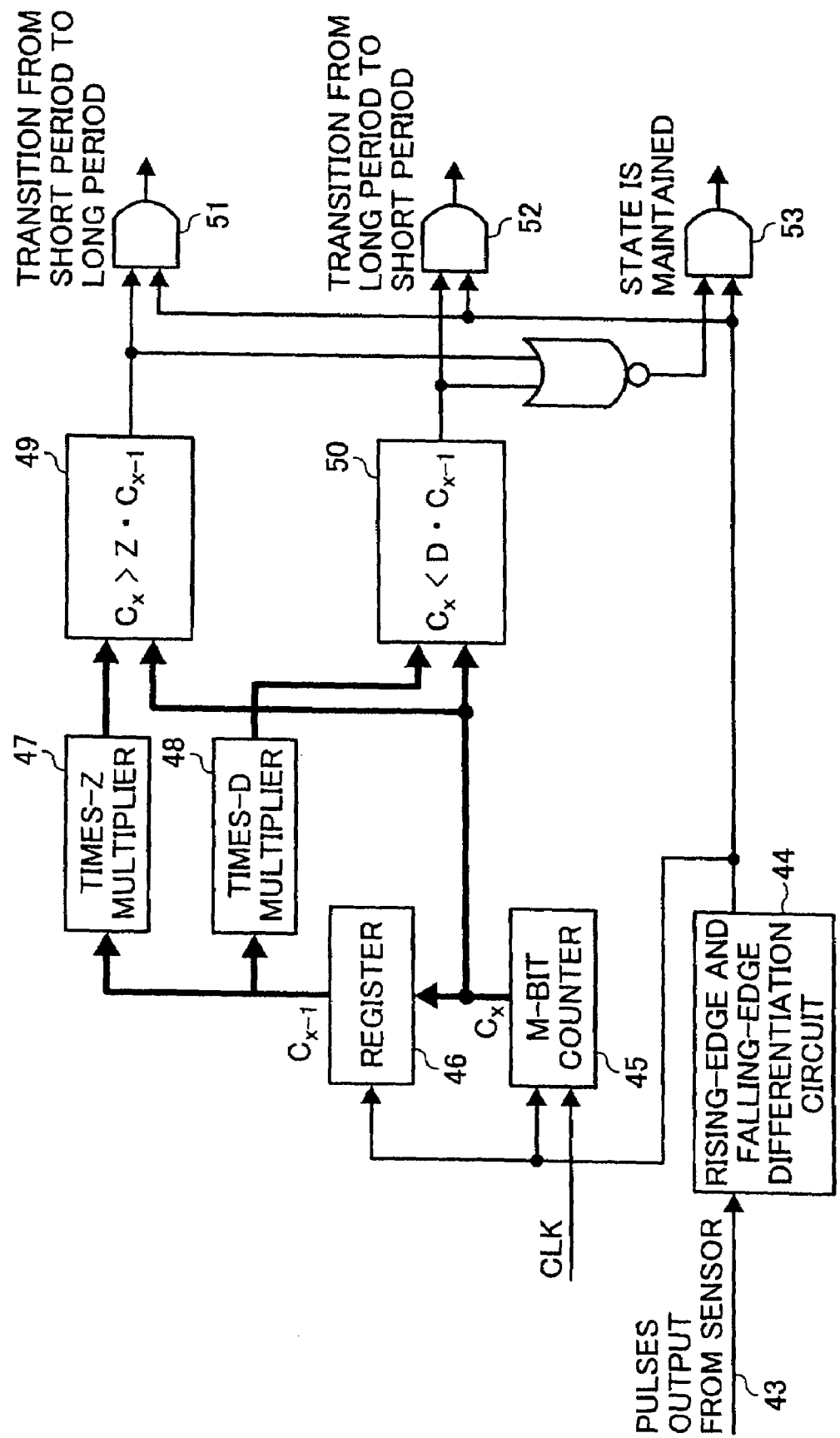
FIG. 7 is a diagram showing a demodulation circuit of the motor controlling circuit according to example embodiments.

In FIG. 7, in order to achieve intended operation, at a falling edge of an output pulse of the differentiating circuit 44, the output of the counter 45 may be set to the register 46, and the counter 45 is cleared.

The circuits may be designed so that the timing of clearing the counter 45 may be a little delayed compared with the timing of setting the output of the counter 45 to the register 46.

During normal motor driving operation, when the rotation rate does not change considerably, existing frequency modulation and demodulation techniques suffice. However, with existing techniques, incorrect detection may occur when the rotation rate changes considerably.

By using example methods of comparing pulse widths with adjacent pulses, demodulation may be allowed even when the rotation rate of the motor changes considerably, and even during activation or deactivation.

When demodulation is carried out while the rotation range of the motor is changing, such as during activation or deactivation, more reliable demodulation can be achieved by changing thresholds (reference values) for code determination in accordance with an expected activation curve or deactivation curve (as compared with normal motor operation).

For example, the pulse period may change to become longer during activation, and the pulse period changes to become shorter during deactivation.

Thus, the values of Z and D may be chosen to be relatively small for activation (e.g., Z=1.8 and D=0.3), while the values of Z and D are chosen to be relatively large for deactivation (e.g., Z=2.28 and D=0.6). Thus, accurate demodulation may be allowed in a wider range of rotation rate profile from activation to deactivation.

The thresholds of the multipliers 47 and 48 shown in FIG. 7 may be set a plurality of times in accordance with rotation rate profile during activation or deactivation.

For example, in the configuration shown in FIG. 7, the values of Z and D based on the activation profile may be used when the motor is activated, the values of Z and D for constant rotation rate may be used in normal feedback control mode when activation ends and normal operation starts, and the values of Z and D based on the deactivation profile may be used when the motor is deactivated.

Alternatively, it is possible to change only the values for activation or deactivation relative to the values for constant rotation rate.

Although the output of the counter 45 is compared with the results of multiplying the value in the register 46 by Z and D, it is possible to calculate a ratio of the outputs of the counter 45 and the register 46 and to detect a transition from a long pulse width to a short pulse width, a transition from a short pulse width to a long pulse width, or state maintained.

When the motor is activated, according to example methods, since absolute-angle information or magnetic-pole-position information of the rotor 9 is detected serially in time, it may not be possible to obtain information until the brushless motor 3 rotates by an angle greater than or equal to a predetermined or desired rotation angle.

Thus, at the time of activation, rotation may be caused by changing the driving phases, as in the case of a pulse motor.

In a most basic method, currents may be caused to flow as shown in FIG. 6 regardless of outputs from the detector to generate a predetermined or desired magnetic field for rotation, thereby activating the brushless motor 3.

However, since it is not possible to detect the magnetic-pole positions of the rotor 9 at this time, the driving phases may be changed at certain timings so as to allow activation.

The motor may be activated as described above, and may be caused to rotate until it becomes possible to detect absolute-angle information or magnetic-pole-position information of the rotor 9.

Upon slight movement of the rotor 9 of the brushless motor 3, a rising edge or falling edge of an output pulse may be detected by the differentiating circuit.

Then, the time measurement counter 45 may start counting to obtain a count value corresponding to an interval between a rising edge and a falling edge or an interval between a falling edge and a rising edge.

Since it is not actually possible to increase the time measurement counter 45 infinitely, the measurement of pulse widths may be started after elapse of a predetermined or desired time from the start of activation.

On the basis of the count value measured by the counter 45, it is possible to determine whether the position of the rotor 9 at the start of activation corresponds to a short-period pulse or a long period pulse.

It is not known whether the first count value obtained by the counter 45 at the time of activation corresponds to a long-period pulse or a short-period pulse.

Distinction between a long-period pulse and a short-period pulse may become possible upon first detection of a transition from a short-period pulse to a long-period pulse or a transition from a long-period pulse to a short-period pulse.

That is, counting for time measurement may be carried out continuously, a count value may be compared with thresholds for code detection during activation, which may be generated using a previous count value, thereby detecting a transition from a short-period pulse to a long-period pulse or a transition from a long-period pulse to a short-period pulse.

When the data sequence of code representing the magnetic-pole positions of the rotor 9 is configured such that a section of rotation angle of 60 degrees corresponds to one codeword, four short-period pulses may correspond to a code "1", and one long-period pulse may correspond to a code "0", after a transition from "1" to "0" is detected, it is possible to detect the current section of rotation angle of 60 degrees by counting the number of succeeding "0"s.

Then, a transition to a next section of rotation angle of 60 degrees can be detected on the basis of a transition from "0" to "1".

When a transition from "0" to "1" is detected, the current position may correspond to the start position of a section of rotation angle of 60 degrees.

Thus, it is possible to detect the current section of rotation angle of 60 degrees by counting the number of succeeding "1"s.

After the magnetic-pole positions are detected as described above, the brushless motor 3 can be driven normally.

When a section of rotation angle of 60 degrees corresponds to three codewords of binarized information, after a transition from "1" to "0" or "0" to "1" is detected, the number of succeeding long-period codes of "0" or "1" may be detected, and the result may be compared with a stored data sequence, thereby detecting the current section of rotation angle of 60 degrees.

Then, the rotation of the rotor 9 may be continued, and codes may be determined continuously.

When a transition from a long-period code of "0" to "1" is detected after detecting three pieces of the same magnetic-pole information, a transition to a next section of rotation angle of 60 degrees may be recognized.

Thus, it is determined that the timing of the transition from "0" to "1" is a timing of switching. Then, the brushless motor 3 can be driven normally.

By storing expected magnetic-pole-position information at the time of deactivation in a storage device separately provided, by executing phase switching in consideration of the magnetic-pole-position information and activation speed, quick activation may be allowed.

After an absolute angle or magnetic-pole positions are determined, switching of code from "0" to "1" or "1" to "0", continuity of absolute-angle information or magnetic-pole-position information, or successive codes can be predicted, so that error detection may be allowed constantly.

Next, an example method of processing that is executed when an error in magnetic-pole positions is detected will be described.

Successive pieces of magnetic-pole position data may be stored in advance.

In the example described earlier, six pieces of magnetic-pole position data (magnetic-pole codewords) may be defined, each composed of 7 bits represented by codes based on reference periods corresponding to long-period pulses.

Error detection may be allowed by sequentially reading the stored magnetic-pole codewords and comparing the magnetic-pole codewords with detected magnetic-pole codewords.

When the stored magnetic-pole codewords sequentially read differ from the detected codewords, the codewords may be corrected to supposed codewords. That is, magnetic-pole information supposed to follow magnetic-pole information previously detected correctly may be used.

A determination circuit and a gate circuit may be provided so that the output of the differentiating circuit 44 may be prohibited when the pulse output changes with the count value of the counter 45 at one half of an expected count value in a section of predicted short-period pulse or long-period pulse in FIG. 7.

This may serve to reduce the possibility of incorrect measurement due to external noise.

At the time of activation or deactivation, the width of a detected pulse may become longer during a period before the motor fully stops, or during a period after the start of activation. Thus, code detection may not be executed during this period, and the number of bits for counting the pulse width may be reduced.

For example, an open-loop control mode may be used during activation, so that a period in which code detection may not be carried out is provided.

At the time of deactivation, the driving of the motor may be turned off immediately before the motor stops or a braking mode for motor driving is provided to stop the motor, so that a period in which code detection may not be carried out is provided.

Now, the braking mode will be described.

Two example methods of generating a braking force using an induced electromotive force of a rotating motor will be described.

Figure 8:
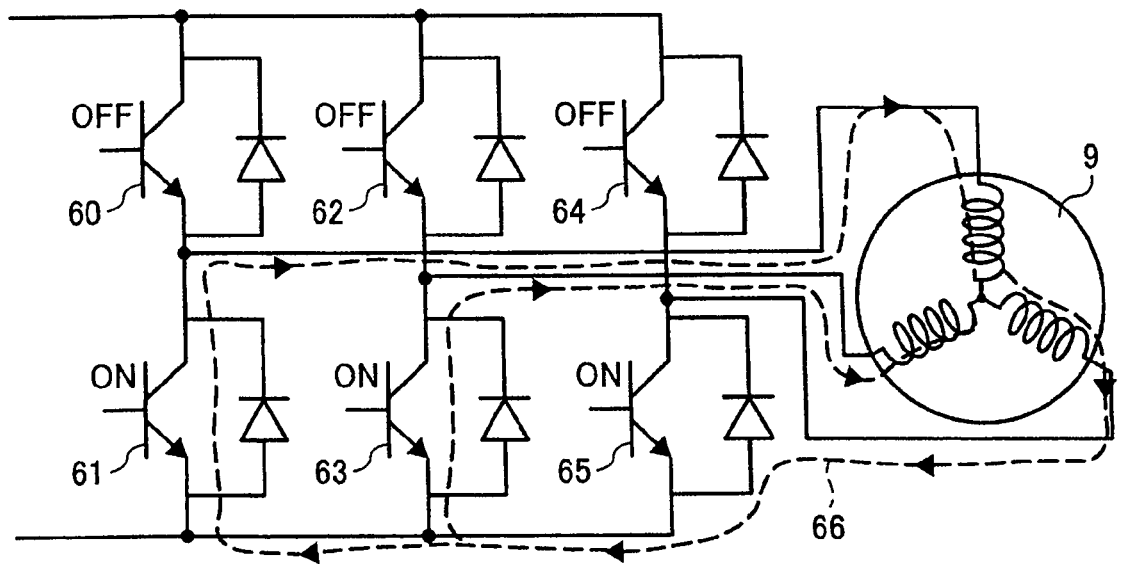
FIG. 8 a circuit diagram for explaining a braking mode of the motor controlling circuit according to example embodiments.

FIG. 8 shows an example configuration for short braking.

In FIG. 8, ground-side transistors 61, 63, and 65 of a three-phase inverter may be all turned on, and positive-power-supply side transistors 60, 62, and 64 are all turned off, whereby motor windings may be short-circuited, so that current can flow in a loop 66.

Thus, the motor may consume the rotating energy while generating heat.

Since the motor windings are simply short-circuited, it is not possible to control the braking force.

When the inertia of the rotary system is large, a large current may flow for a long time, so that care may be taken for heat generation of the brushless motor 3 and allowable currents of the transistors.

When the braking force is to be controlled, soft braking may be used.

Figure 9:
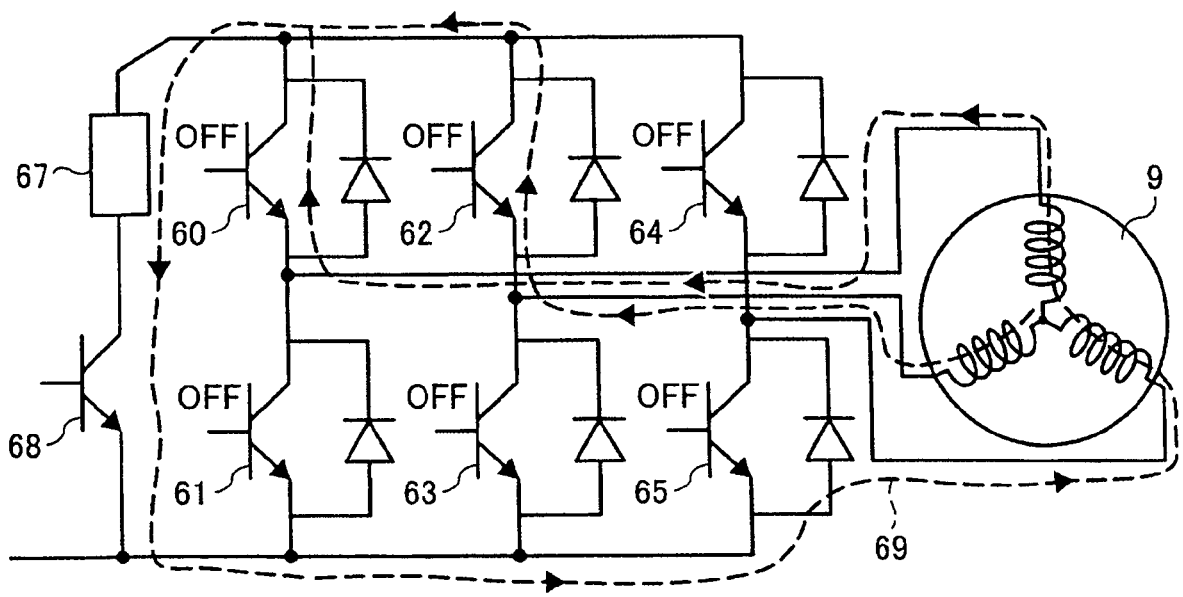
FIG. 9 a circuit diagram for explaining a modification of the braking mode shown in FIG. 8.

FIG. 9 shows an example configuration for soft braking.

All the transistors 60, 61, 62, 63, 64, and 65 of a three-phase inverter may be turned off, a braking current 69 that may flow through a feedback diode 67 may be output, and the braking force can be controlled as desired by exercising control using a transistor 68 or the like.

As described above, according to example embodiments, in the brushless motor 3 having the rotor 9 and the plurality of coils 27, 29, and 31 with different phases, the magnetic unit 11 may be provided on the outer circumferential surface of the rotor 9 and may be configured to have magnetic regions 11a and magnetic regions 11b having mutually different widths.

Thus, by detecting short-period pulses and long-period pulses by the MR sensor 13, a specific position (absolute angle) of the rotor 9 can be determined.

Since the absolute phase of the rotor 9 is known even when the motor is powered off, the rotor 9 can be quickly driven after power on.

Therefore, it is possible to enter a feedback control mode quickly, so that quick activation is allowed.

The absolute-angle information or magnetic-pole-position information and rotation-angle information of the rotor 9 may be configured so that the ratio of pulse widths associated with code "1" and code "0" can be 1:(2+N) or (2+N):1 (N is a natural number).

Short-period pulses may be repeated (2+N) times to form a code of "1" or "0" having the same period as a long-period pulse.

Thus, even when the rotation rate of the rotor 9 changes within a certain range, codes of "1" and "0" can be demodulated without detection errors.

It is possible to obtain rotation-angle information in each section of predetermined or desired rotation angle.

By detecting long-period pulses and short-period pulses on the basis of comparison with the period of an immediately preceding long-period pulse or short-period pulse, stable code detection may be allowed when the rotation rate changes during activation or deactivation or when the rotation rate changes during normal operation.

Since an MR sensor, which may be a magnetic-effect sensor, may be used as the angular-position detector 13, compared with the FG method, in which a comb-shaped pattern may be formed on a printed board to allow detection of rotation-angle information, a higher resolution can be achieved.

It is possible to detect absolute-angle information or magnetic-pole-position information and rotation-angle information of the rotor 9 immediately after the start of rotation.

Since an absolute angle of the rotor 9 is obtained on the basis of an output from one MR sensor 13, consumption current can be reduced compared with a case where two or more sensors are used.

Next, additional embodiments of the present invention will be described.

In the following example embodiments, parts that operate correspondingly to parts described in the context of the first embodiment will be designated by the same numerals, and description thereof will be omitted.

The following description will be directed mainly to parts that differ from the first embodiment.

Figure 10:
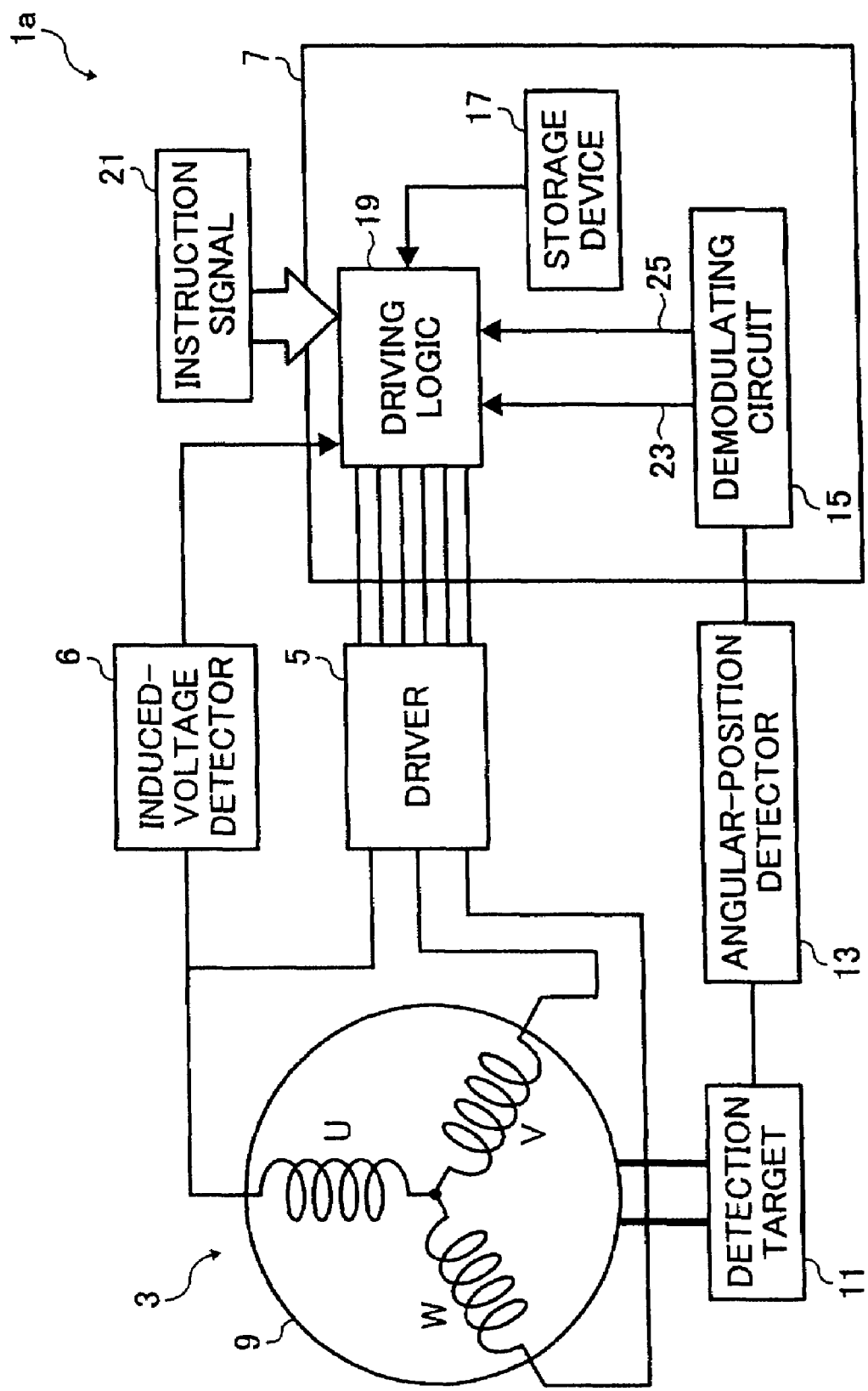
FIG. 10 is a diagram showing a control circuit of a motor driving device according to example embodiments of the present invention.

FIG. 10 is a block diagram showing a motor controlling circuit according to a second embodiment of the present invention.

Compared with the driving control circuit 1 shown in FIG. 1, a driving control circuit 1a additional may include an induced-voltage detector (rotation-angle detector) 6, and the procedure of processing executed by the driving logic 19 in the controller 7 differs.

The driving control circuit 1a may be configured otherwise the same as the driving control circuit 1.

Although an induced voltage that occurs on the U-phase coil is measured in example embodiments, an induced voltage that occurs on the V-phase coil or the W-phase coil may be measured.

Figure 11:
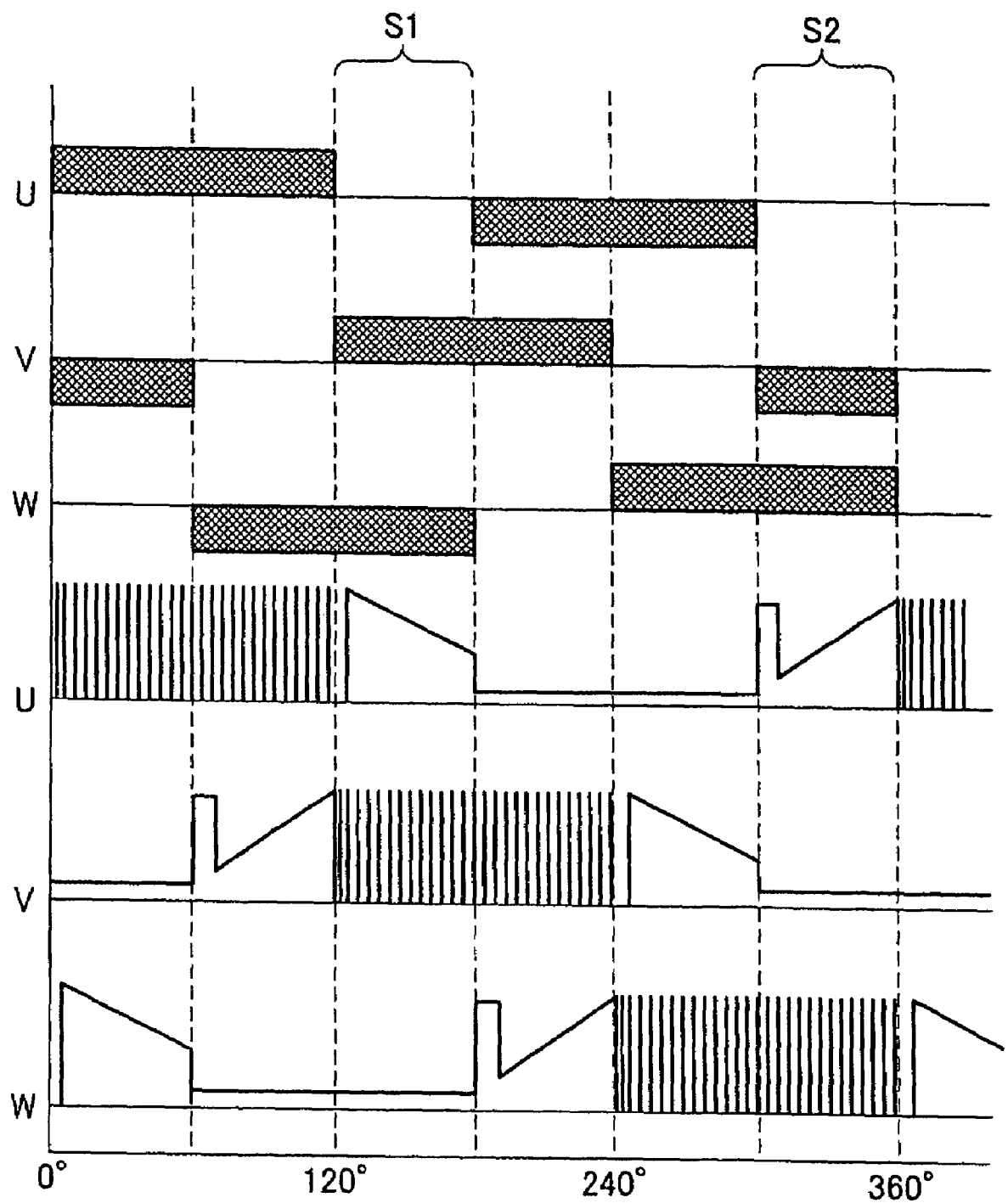
FIG. 11 a timing chart of currents that flow through individual coils of the motor driving device shown in FIG. 10.

FIG. 11 is a timing chart showing timings for switching excitation currents and voltages applied to coils of individual phases in a two-pole three-phase motor.

A current that flows through coils may flow from a coil of a phase at H level to a coil of a phase at L level.

For example, in a section s1, in which the V-phase coil is at H level and the W-phase coil at L level, a current may flow from the V-phase coil (first coil) to the W-phase coil (first coil), and an induced voltage may occur on the U-phase coil (second coil), which is at 0 level and through which a current does not flow.

At this time, the controller 7 may be exercising PWM control. Thus, the voltage on the V-phase coil through which a current flows may fluctuate according to the PWM switching frequency, the voltage on the W-phase coil may be at 0 level, and an induced voltage may occur on the U-phase coil. The induced-voltage detector may be implemented, for example, by a comparator.

For example, timing of occurrence of an induced voltage on the U-phase coil can be detected on the basis of comparison with a threshold chosen to be one half of a DC voltage applied to the motor. An induced voltage can be detected in a similar manner in a section s2.

In the case of the two-pole three-phase motor, each interval between broken lines in the timing chart shown in FIG. 6 may be 60 degrees, and each interval between timings of detection of induced voltages may be 180 degrees.

By calculating a difference between the timing of detection of an induced voltage and the absolute-angle detection information or magnetic-pole-position information of the rotor 9, an error can be corrected so that accurate positions of magnetic poles can be obtained.

When an existing brushless motor is used in a copying machine, the following problem may arise.

In an existing brushless motor, rotation may be controlled on the basis of detection of the position of a rotor using sensors such as Hall elements.

For example, in the case of a three-phase brushless motor, one Hall element is needed for each phase, so that three Hall elements may be needed in total.

A driver may be needed to calculate switching timings on the basis of signals output from the Hall elements and to cause currents to flow through coils of individual phases according to the switching timings.

Since the magnitudes of signals output from the Hall elements are usually small, the signals output from the Hall elements may be amplified using Hall amps.

Thus, Hall amps may be provided in proximity to the motor, so that a substrate for providing the Hall amps may be needed.

Since it is inefficient to provide a substrate only for the Hall amps, usually, parts for calculating timings for causing currents to flow through the coils of the individual phases, a driver, and so forth may also be provided on the substrate.

As a result, a considerable number of lines may be needed, such as lines for a driving voltage, a voltage for a logic IC, a start/stop signal, a rotation-direction signal, a braking signal, and an encoder signal. This may result in increased cost and wiring inefficiency.

In contrast, when the brushless motor 3 according to example embodiments is used in a copying machine, modulated rotation information and magnetic-pole information on an encoder (detection target) that rotates together with the rotor 9 of the brushless motor 3 may be detected together. Thus, the Hall amps are not needed, so that it is not needed to provide a substrate for providing Hall amps in proximity to the motor.

Accordingly, it is possible to use a part of a substrate of the main unit of the copying machine.

In the brushless motor 3 according to example embodiments, it may suffice to send only encoder signals to the substrate of the main unit of the copying machine, so that it may suffice to provide a line for capturing encoder signals and a line for supplying driving currents to the brushless motor 3.

Thus, the number of lines needed may be reduced, and therefore cost needed for the lines may be reduced.

Since the encoder signals and the motor driving currents are both unsusceptible to noise, the effect of disturbance can be alleviated. This may serve to improve the precision of the driving control device.

Although the actual rotation of the rotor 9 is synchronized with the switching timings of excitation currents for the coils of the individual phases by detecting induced voltages that may occur on the U-phase coil in the configuration shown in FIG. 10, alternatively, it is possible to detect induced voltages that may occur on the V-phase coil or the W-phase coil in similar manners.

It is possible to constantly measure induced voltage and perform correction on the basis of difference from the magnetic-pole information 23 obtained from the demodulating circuit 23.

Also, it is possible to store a difference obtained at the time of activation in a non-volatile memory or the like, and to switch excitation currents on the basis of values corrected using the stored difference.

It is possible to measure an induced voltage and to store a difference in a non-volatile memory or the like in a manufacturing process and to omit the induced-voltage detector 6 implemented by an analog circuit or the like in the final product, so that cost of parts can be reduced.

Additional example embodiments of the present invention will be described.

In example embodiments, an optical detector may be used as an angular-position detector.

Figure 12:
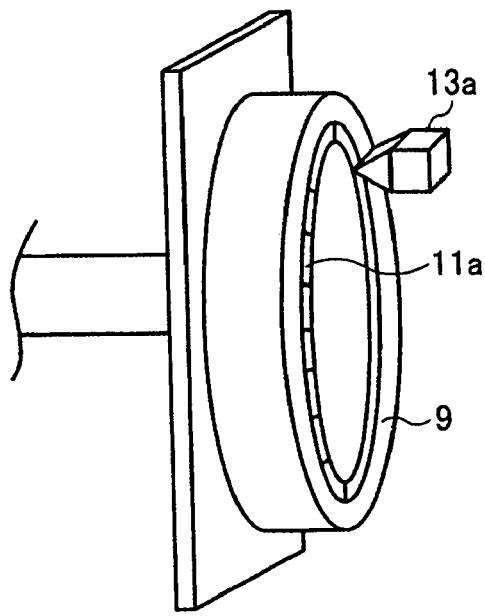
FIG. 12 is a perspective view of a motor driving device according to example embodiments of the present invention, in which a reflection photosensor is used as an angular-position detector.

FIG. 12 shows a case where a reflection photosensor is used as an optical detector.

Figure 13:
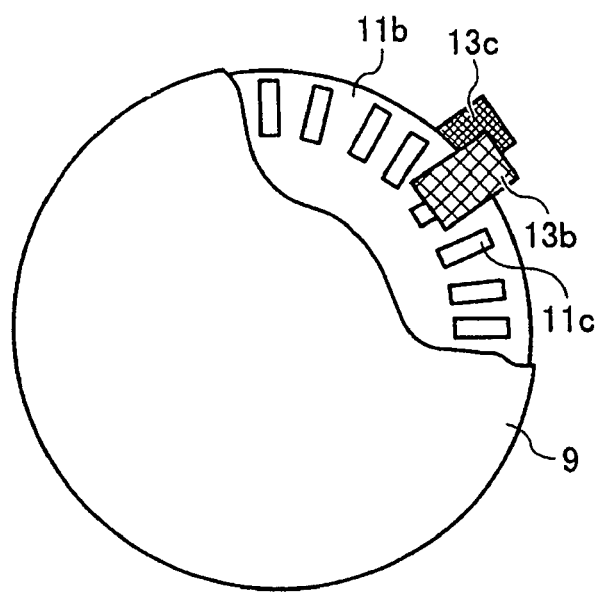
FIG. 13 is a perspective view of a motor driving device according to example embodiments of the present invention, in which a transmission photosensor is used as an angular-position detector.

FIG. 13 shows a case where a transmission photosensor is used as an optical detector.

In the case of the reflection photosensor shown in FIG. 12, a scale 11a having light reflecting regions and light absorbing regions may be provided on the outer circumferential surface of the rotor 9, and an optical element 13a may be fixed at a position opposing the scale 11a.

The optical element 13a may include a light emitter and a photoreceptor arranged so that light emitted by the light emitter can be reflected or absorbed by the scale 11a and reflected light is received by the photoreceptor.

Information regarding the rotor 9 can be obtained on the basis of the intensity of light received by the photoreceptor.

In the case of the transmission photosensor shown in FIG. 13, slits 11c may be provided on a scale 11b that rotates in synchronization with the rotor 9, and a light emitter 13b and a photoreceptor 13c may be arranged opposing each other across the scale 11b.

Light emitted by the light emitter 13b and transmitted through the slits 11c may be received by the photoreceptor 13c.

Information regarding the rotor 9 can be obtained on the basis of signals output from the photoreceptor 13c.

Although the scale 11a or 11b is provided on the outer circumferential surface of the rotor 9 in example embodiments, the scale 11a or 11b may be provided on any other part that rotates in synchronization with the rotor 9.

Since an absolute angle of the rotor 9 can be obtained using a single reflection photosensor or transmission photosensor, consumption current can be reduced compared with a case where two or more sensors are used.

Additional example embodiments of the present invention will be described with reference to FIG. 14.

Figure 14:
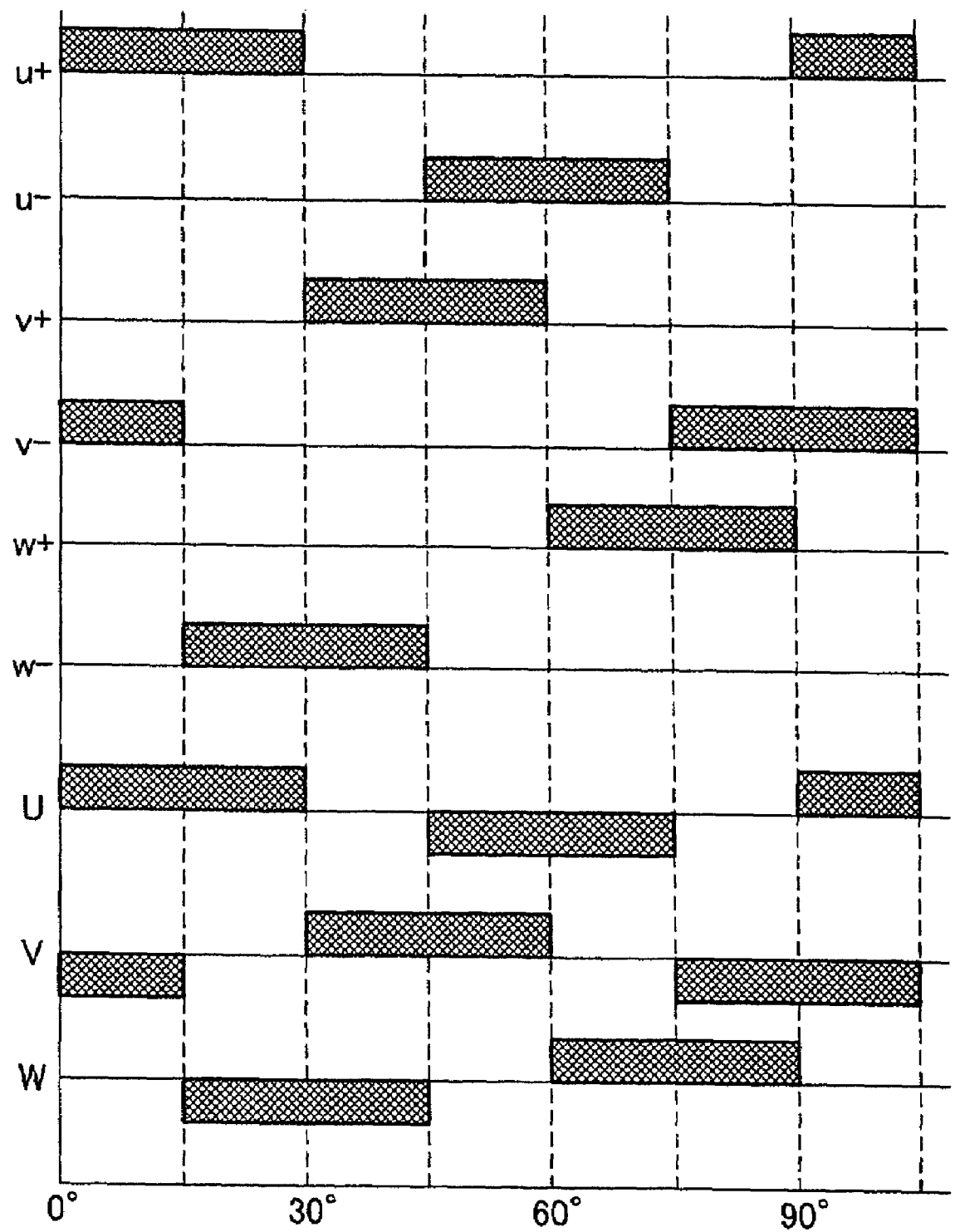
FIG. 14 is a timing chart of currents that flow through individual coils of a motor driving device according to example embodiments of the present invention, which is a motor driving device for an eight-pole three-phase motor.

FIG. 14 is a timing chart regarding an eight-pole three-phase motor.

The basic configuration of switching transistors may be similar to that in the case of the two-pole three-phase motor described earlier. However, since coils having 24 poles in total are provided circumferentially, one section defined by broken lines in FIG. 14 may correspond to an angle of 15 degrees of rotation of the rotor 9.

That is, in the case of the two-pole three-phase motor, a rotation of 360 degrees may be achieved by switching among six sections as in the timing chart shown in FIG. 6.

In contrast, in the case of the eight-pole three-phase motor, as in the timing chart shown in FIG. 14, switching among six sections may result in only a quarter rotation of 90 degrees, and a full rotation may be achieved by repeating the six sections four times.

Example embodiments of the present invention will be described.

In example embodiments, the motor controlling circuit described above may be used in an image forming apparatus.

Figure 15:
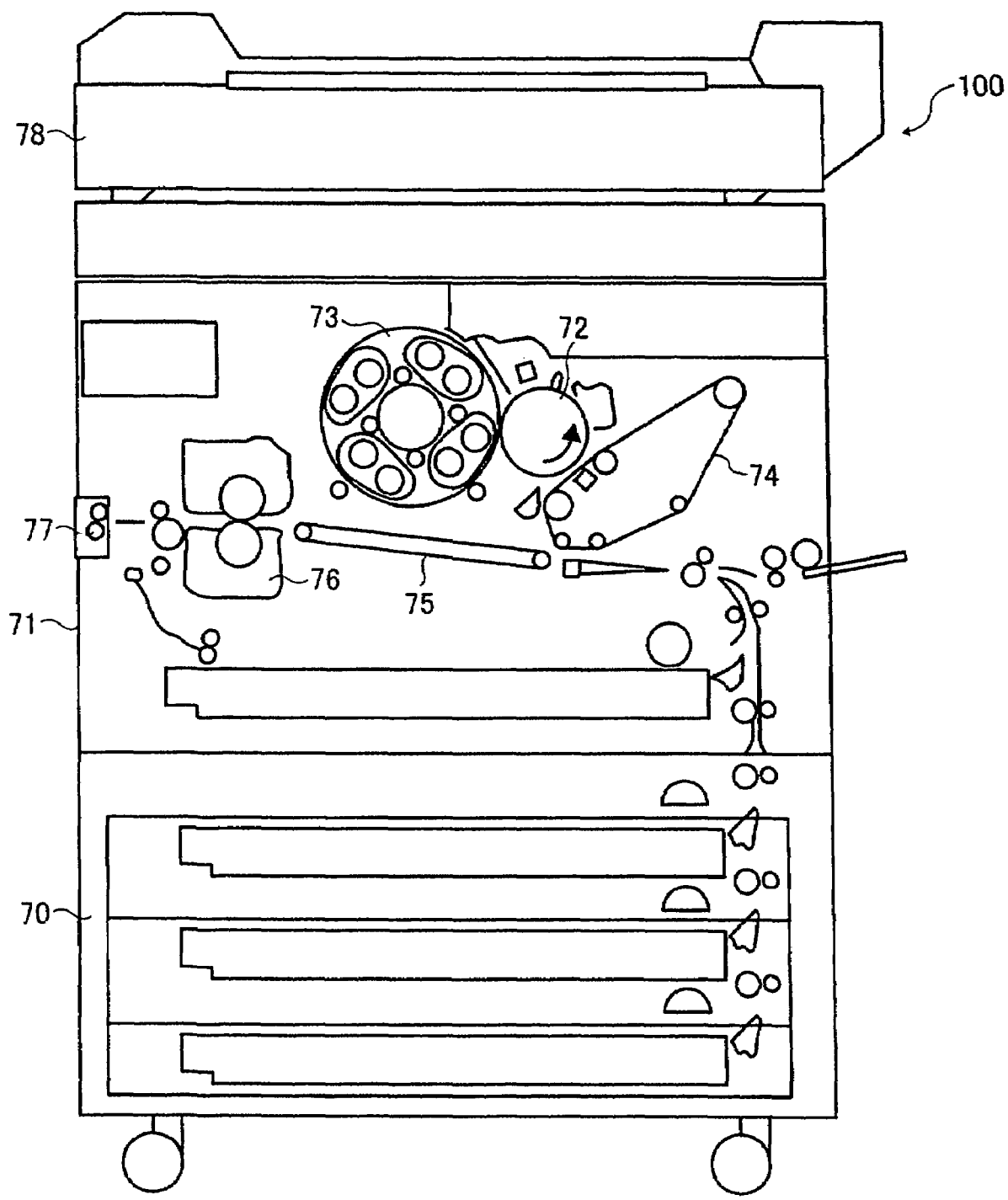
FIG. 15 is a schematic illustration of an image forming apparatus including a motor driving device according to at least one example embodiment of the present invention.

Referring to FIG. 15, an image forming apparatus 100 may be a color copying machine.

The image forming apparatus 100 may include a main unit 71, a reading device 78 provided on an upper part of the main unit 71, and a sheet feeding device 70 provided on a lower part of the main unit 71.

The main unit 71 may include a photosensitive drum 72, a rotary developing unit 73, an intermediate transfer belt 74, a transporting belt 75, a fixing unit 76, and/or a sheet-ejection roller 77.

In the color copying machine, variation of the loads of the photosensitive drum 72, the intermediate transfer belt 74, and the transporting belt 75 at a timing of entry of a sheet into the transferring unit may considerably affect the quality of a final image.

Thus, it may be desirable to drive the photosensitive drum 72, the intermediate transfer belt 74, and the transporting belt 75 with improved precision.

For this purpose, the motor control circuit 1 according to example embodiments described above may be used to drive the photosensitive drum 72, the intermediate transfer belt 74, and the transporting belt 75.

According to example embodiments, since the motor control circuit 1 may be used to drive the photosensitive drum 72, the intermediate transfer belt 74, and the transporting belt 75, it is possible to start image recording in a shorter period from arrival of the first recording start instruction at the brushless motor 3.

Accordingly, the speed of image output and the quality of images can be improved.

Additional example embodiments of the present invention will be described with reference to FIG. 16.

In example embodiments, the motor control circuit 1 according to one of the embodiments described above may be used in an image forming apparatus.

Figure 16:
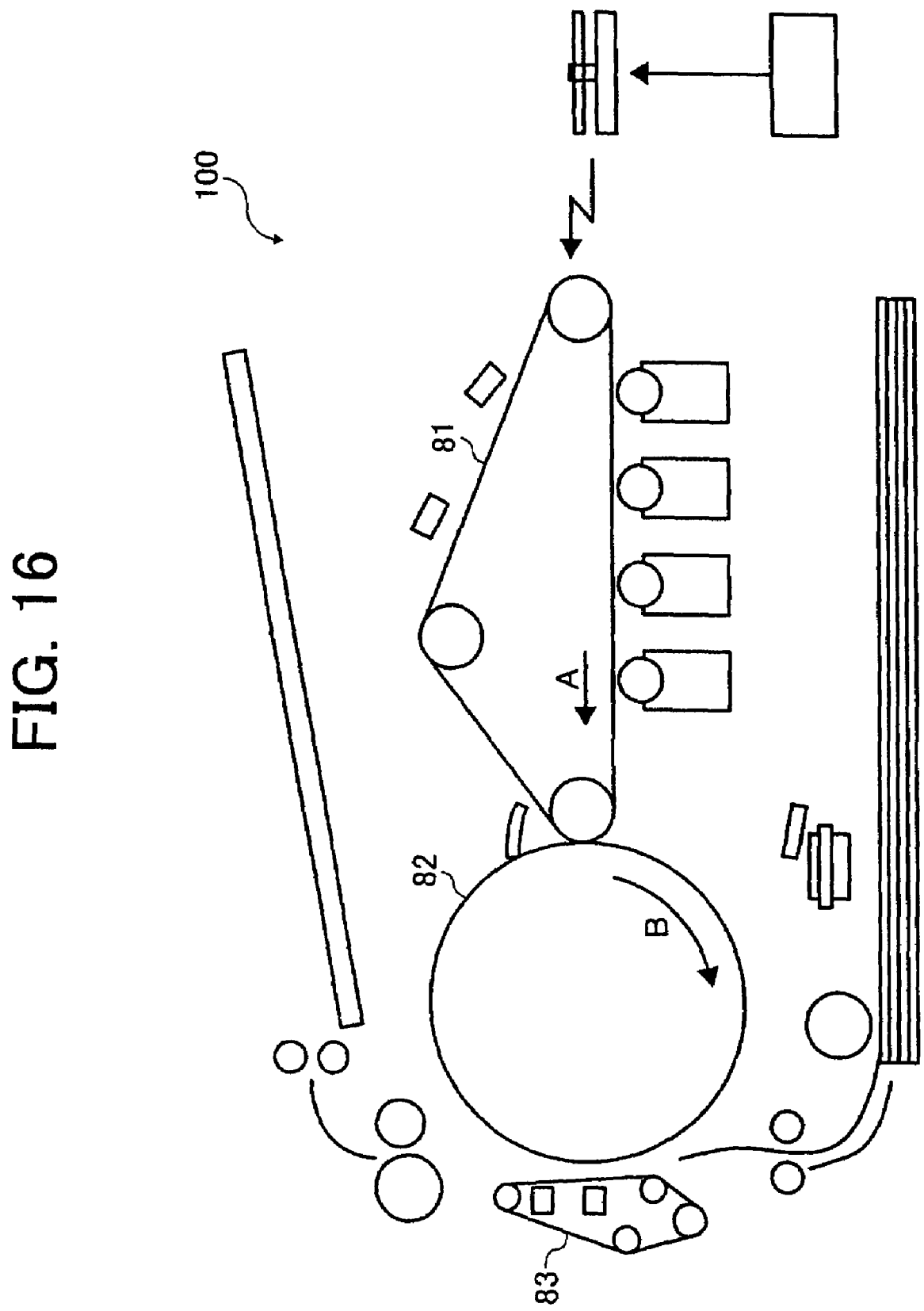
FIG. 16 is a schematic illustration of an image forming apparatus including a motor driving device according to at least one example embodiment of the present invention.

Referring to FIG. 16, an image forming apparatus 100 may include a photosensitive belt (image carrier) 81, an intermediate transfer drum 82, and a transferring belt 83.

In a color copying machine, variation of the loads of the photosensitive belt 81, the intermediate transfer drum 82, and the transferring belt 83 at a timing of entry of a sheet into the transferring unit may considerably affect the quality of a final image.

Thus, it may be desirable to drive the photosensitive belt 81, the intermediate transfer drum 82, and the transferring belt 83 with improved precision.

For this purpose, the motor control circuit 1 according to example embodiments described above may be used to drive the photosensitive belt 81, the intermediate transfer drum 82, and the transferring belt 83.

According to example embodiments, since the motor control circuit 1 is used to drive the photosensitive belt 81, the intermediate transfer drum 82, and the transferring belt 83, it is possible to start image recording in a shorter period from arrival of the first recording start instruction at the brushless motor 3.

Accordingly, the speed of image output and the quality of images can be improved.

Additional example embodiments of the present invention will be described with reference to FIG. 17.

Figure 17:
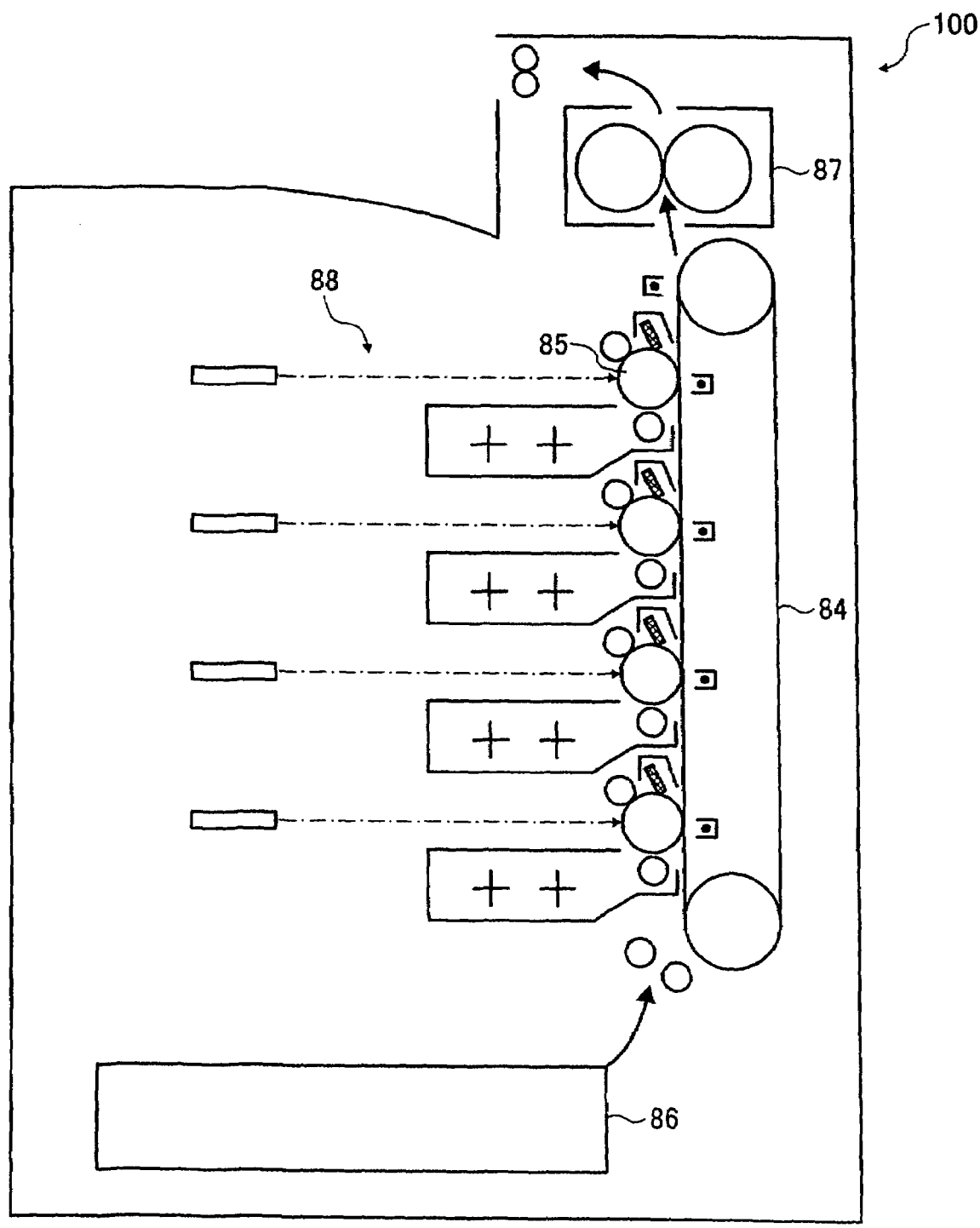
FIG. 17 is a schematic illustration of an image forming apparatus including a motor driving device according to at least one example embodiment of the present invention.

Referring to FIG. 17, an image forming apparatus 100 according to example embodiments may include a sheet feeding device 86 in a lower part, a fixing unit 87 in an upper part, and an image forming unit 88 in a middle part.

The image forming unit 88 may include a photosensitive member 85 and a transporting and direct transferring belt 84 opposing the photosensitive member 85.

In a color copying machine, variation of the load of the transporting and direct transferring belt 84 at a timing of entry of a sheet into the transferring unit may considerably affect the quality of a final image.

Thus, it may be desirable to drive the transporting and direct transferring belt 84 with improved precision.

Accordingly, in example embodiments, the motor controlling circuit according to example embodiments described above may be used to drive the transporting and direct transferring belt 84.

According to example embodiments, since the motor controlling circuit 1 according to example embodiments described above may be used to drive the transporting and direct transferring belt 84 in an image forming apparatus in which a color image is formed by rotating the transporting and direct transferring belt 84, it is possible to start image recording in a shorter period from arrival of the first recording start instruction at the brushless motor 3.

Accordingly, the speed of image output and the quality of images can be improved.

Additional example embodiments of the present invention will be described with reference to FIG. 18.

In example embodiments, the motor controlling circuit 1 according to example embodiments described above may be used in an image reading device.

Figure 18:
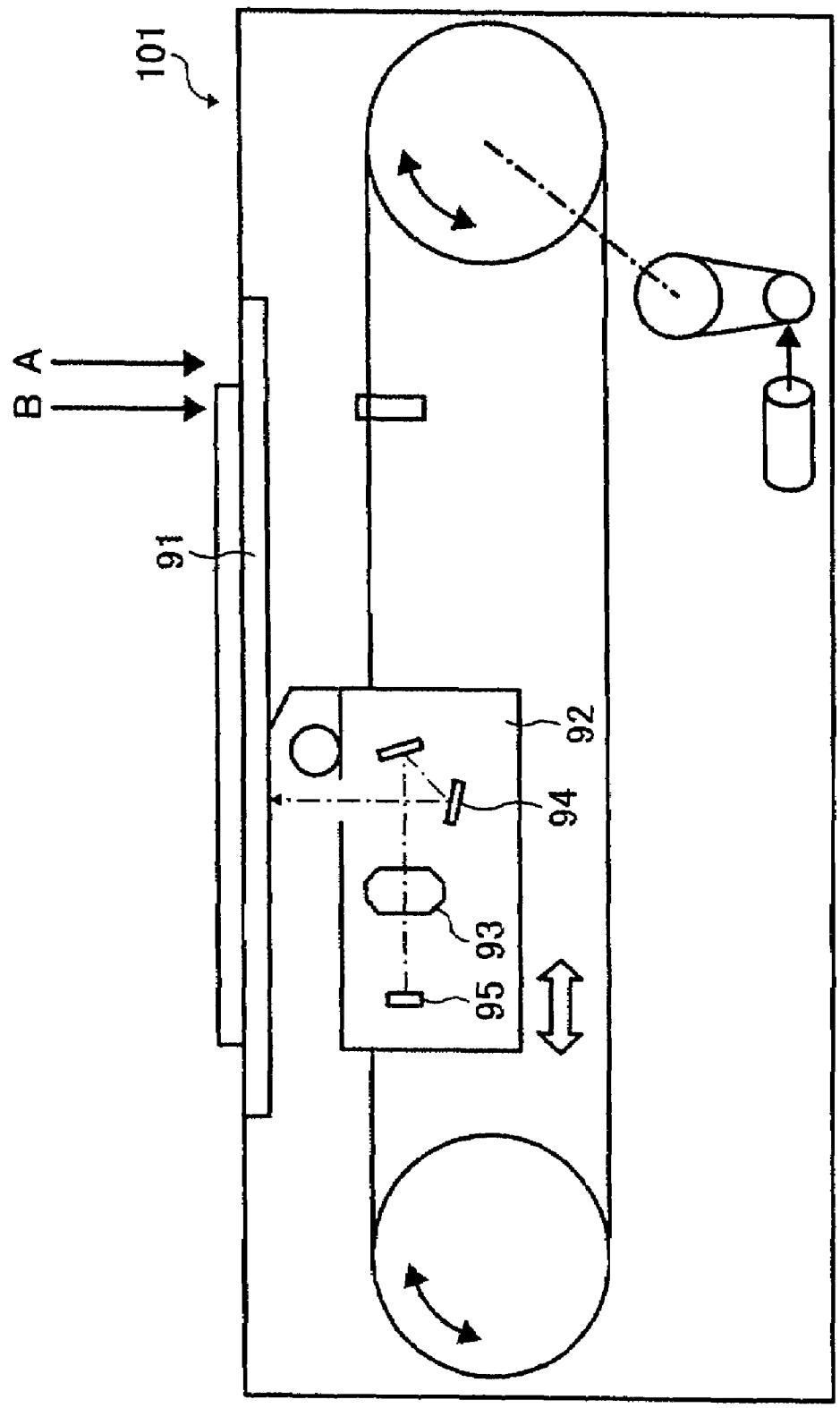
FIG. 18 is a schematic illustration of an image reading device including a motor driving device according to at least one example embodiment of the present invention.

Referring to FIG. 18, an image reading device 101 may include a document table 91, and a photoelectric conversion unit (image reader) 92.

The photoelectric conversion unit 92 may include a charge coupled device (CCD) 95, a lens 93, and a mirror 94.

In example embodiments, the motor controlling circuit 1 according to example embodiments described above may be used to drive the photoelectric conversion unit 92.

According to example embodiments, the motor controlling circuit 1 according to example embodiments described above may be used to drive the photoelectric conversion unit 92.

Thus, it is possible to quickly start driving the photoelectric conversion unit 92 and to drive the photoelectric conversion unit 92 with improved precision.

The present invention is not limited to example embodiments described above, and various modifications can be made without departing from the spirit of the present invention.

Although an absolute angle of the rotor 9 is obtained by a single detector 13 in example embodiments, without limitation, two or more sensors may be used.

The above-described example embodiments are illustrative, and numerous additional modifications and variations are possible in light of the above teachings. For example, elements and/or features of different illustrative and example embodiments herein may be combined with each other and/or substituted for each other within the scope of this disclosure and appended claims. It is therefore to be understood that within the scope of the appended claims, the disclosure of this patent specification may be practiced otherwise than as specifically described herein.

Obviously, numerous modifications and variations of the present invention are possible in light of the above teachings.

It is therefore to be understood that, the invention may be practiced otherwise than as specifically described herein.

What is claimed is:

1. A driving control device for a brushless motor having a rotor and a plurality of coils with different phases, the driving control device comprising:
   a detection target configured to rotate in synchronization with rotation of the rotor, the detection target having formed thereon a pattern representing modulation information;
   a detector configured to read the pattern and to output modulated output signals;
   a demodulator configured to demodulate the modulated output signals and to obtain demodulated information;
   a controller configured to control rotation of the rotor on the basis of at least the demodulated information obtained by the demodulator; and
   an output-signal-information detector configured to detect output-signal information regarding the modulated output signals,
   wherein the controller detects an absolute angle of the rotor or positions of magnetic poles of the rotor on the basis of the demodulated information obtained by the demodulator and the output-signal information detected by the output-signal-information detector.

2. The driving control device according to claim 1, wherein:
   the detector is a magnetic sensor, the pattern includes alternate N-pole magnetic regions and S-pole magnetic regions, and magnetic regions located in an area have a width different from a width of magnetic regions located in another area.

3. The driving control device according to claim 1, wherein:
   the detector is a reflection photosensor, the pattern formed on the detection target includes reflectors that are located alternately and that exhibit different brightnesses, and reflectors provided in an area have a size different from a size of reflectors provided in another area.

4. The driving control device according to claim 1, wherein:
   the detector includes at least one transmission photosensor, the pattern formed on the detection target includes a plurality of slits, and some of the slits have a size different from a size of other slits.

5. The driving control device according to claim 1, further comprising:
   a rotation-angle detector configured to detect a rotation angle of the rotor,
   wherein when a current flows through a first coil of the plurality of coils, a current does not flow through a second coil of the plurality of coils and an induced voltage occurs on the second coil, and the rotation-angle detector detects the rotation angle of the rotor on the basis of the induced voltage.

6. A driving control device for a brushless motor having a rotor and a plurality of coils with different phases, the driving control device comprising:
   a detection target configured to rotate in synchronization with rotation of the rotor, the detection target having formed thereon a pattern representing modulation information;
   a detector configured to read the pattern and to output modulated output signals;
   a demodulator configured to demodulate the modulated output signals and to obtain demodulated information;

a controller configured to control rotation of the rotor on the basis of at least the demodulated information obtained by the demodulator; and a pulse counter configured to count a number of the output pulses, wherein the detector is configured to read the pattern and to thereby output modulated output pulses, the demodulator is configured to demodulate the output pulses output from the detector and to thereby obtain demodulated information, the controller is configured to control rotation of the rotor on the basis of the demodulated information obtained by the demodulator and the number of the output pulses counted by the pulse counter, and the pattern is formed so that output pulses having different pulse widths are output in association with different positions of the detection target.

7. An image forming apparatus, comprising:

an image carrier configured to carry an electrostatic latent image;

a transferring unit configured to transfer a toner image on the image carrier to a transferring material; and a transporting unit configured to transport the transferring material, wherein each of the image carrier, the transferring unit, and the transporting unit includes at least one driving control according to claim 1.

8. An image reading apparatus, comprising:

an image reader configured to read an image of an original document; and at least one driving control device according to claim 1 or claim 6.

9. The driving control device according to claim 6, wherein:

the output pulses output from the detector include a plurality of units each composed of a combination of short-period and long-period pulses.

10. The driving control device according to claim 9, wherein:

the individual units are composed of short-period and long-period pulses combined by different ratios.

11. The driving control device according to claim 9, further comprising:

a binarizer configured to binarize the long-period pulses and the short-period pulses, wherein the demodulator determines whether an output pulse is a long-period pulse or a short-period pulse on the basis of a type of a binary code generated by the binarizer.

12. The driving control device according to claim 6, wherein:

the detector is a magnetic sensor, the pattern includes alternate N-pole magnetic regions and S-pole magnetic regions, and magnetic regions located in an area have a width different from a width of magnetic regions located in another area.

13. The driving control device according to claim 6, wherein:

the detector is a reflection photosensor, the pattern formed on the detection target includes reflectors that are located alternately and that exhibit different brightnesses, and reflectors provided in an area have a size different from a size of reflectors provided in another area.

14. The driving control device according to claim 6, wherein:

the detector includes at least one transmission photosensor, the pattern formed on the detection target includes a plurality of slits, and some of the slits have a size different from a size of other slits.

15. The driving control device according to claim 6, wherein:

the output pulses detected from the pattern information formed on the detection target include a plurality of units each composed of a combination of short-period and long-period pulses, and magnetic-pole positions of the rotor are detected.

16. The driving control device according to claim 6, wherein:

the output pulses detected from the pattern information formed on the detection target include a plurality of units each composed of a combination of short-period and long-period pulses, the individual units are composed of short-period and long-period pulses combined by different ratios, and an absolute angle of the rotor is detected.

17. The driving control device according to claim 6, wherein:

the demodulator uses different reference values to determine whether an output pulse is a long-period pulse or a short-period pulse between acceleration or deceleration of the motor and constant rotation of the rotor.

18. The driving control device according to claim 6, further comprising:

a binary-information storage unit configured to store binary information obtained by binarizing the long-period pulses and the short-period pulses; and an error-detection-information detector configured to check a difference between the binary information stored in the binary-information storage unit and binary information obtained by binarizing the output pulses detected by the detector.

19. The driving control device according to claim 6, further comprising:

a rotation-angle detector configured to detect a rotation angle of the rotor, wherein when a current flows through a first coil, a current does not flow through a second coil and an induced voltage occurs on the second coil, and the rotation-angle detector detects the rotation angle of the rotor on the basis of the induced voltage.

* * * * *